(12) United States Patent
Katsuyama

(10) Patent No.: US 10,116,817 B2
(45) Date of Patent: Oct. 30, 2018

(54) IMAGE FORMING APPARATUS AND IMAGE FORMING SYSTEM INCORPORATING SAME

(71) Applicant: Goro Katsuyama, Kanagawa (JP)

(72) Inventor: Goro Katsuyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/642,418

(22) Filed: Jul. 6, 2017

(65) Prior Publication Data

US 2018/0020106 A1 Jan. 18, 2018

(30) Foreign Application Priority Data

Jul. 13, 2016 (JP) .................................. 2016-138572
Apr. 28, 2017 (JP) .................................. 2017-089750

(51) Int. Cl.
*H04N 1/00* (2006.01)

(52) U.S. Cl.
CPC ....... *H04N 1/00496* (2013.01); *H04N 1/0044* (2013.01); *H04N 1/00251* (2013.01); *H04N 1/00411* (2013.01); *H04N 1/00445* (2013.01); *H04N 2201/0063* (2013.01); *H04N 2201/0082* (2013.01); *H04N 2201/0089* (2013.01)

(58) Field of Classification Search
USPC ...................................................... 358/1.15
See application file for complete search history.

(56) References Cited

U.S. PATENT DOCUMENTS

| | | | |
|---|---|---|---|
| 2003/0170041 A1 | 9/2003 | Katsuyama et al. | |
| 2006/0075934 A1* | 4/2006 | Ram | B60N 3/004 108/44 |
| 2007/0028187 A1 | 2/2007 | Katsuyama | |
| 2007/0035564 A1 | 2/2007 | Katsuyama | |
| 2009/0316201 A1* | 12/2009 | Nakai | H04N 1/00408 358/1.15 |
| 2010/0238091 A1 | 9/2010 | Katsuyama | |
| 2010/0238197 A1 | 9/2010 | Katsuyama et al. | |
| 2011/0299234 A1* | 12/2011 | Leyva Arboleda | G09F 15/0062 361/679.01 |

(Continued)

FOREIGN PATENT DOCUMENTS

| | | |
|---|---|---|
| JP | 2009-063979 | 3/2009 |
| JP | 2009-300878 | 12/2009 |

(Continued)

OTHER PUBLICATIONS

Akira et al., Image Forming Device, Feb. 20, 2002, Machine Translated Japanese Patent Application Publicaton, JP2002055501, All Pages.*

*Primary Examiner* — Ngon Nguyen

(74) *Attorney, Agent, or Firm* — Cooper & Dunham LLP

(57) ABSTRACT

An image forming apparatus includes a display and an image forming unit. The display includes a display screen to display a preview image before an image is formed on a recording medium. The image forming unit forms, on the recording medium, an image corresponding to the preview image displayed on the display screen. Each of a vertical length and a horizontal length of the display screen is equal to or greater than a length of a long side of a maximum size recording medium on which an image is to be formed by the image forming unit.

11 Claims, 28 Drawing Sheets

(56) References Cited

U.S. PATENT DOCUMENTS

2015/0365561 A1\* 12/2015 Lee .................... H04N 1/00493
358/452

FOREIGN PATENT DOCUMENTS

| | | |
|---|---|---|
| JP | 2015-022272 | 2/2015 |
| JP | 2015-036315 | 2/2015 |

\* cited by examiner

FIG. 40
FIG. 41
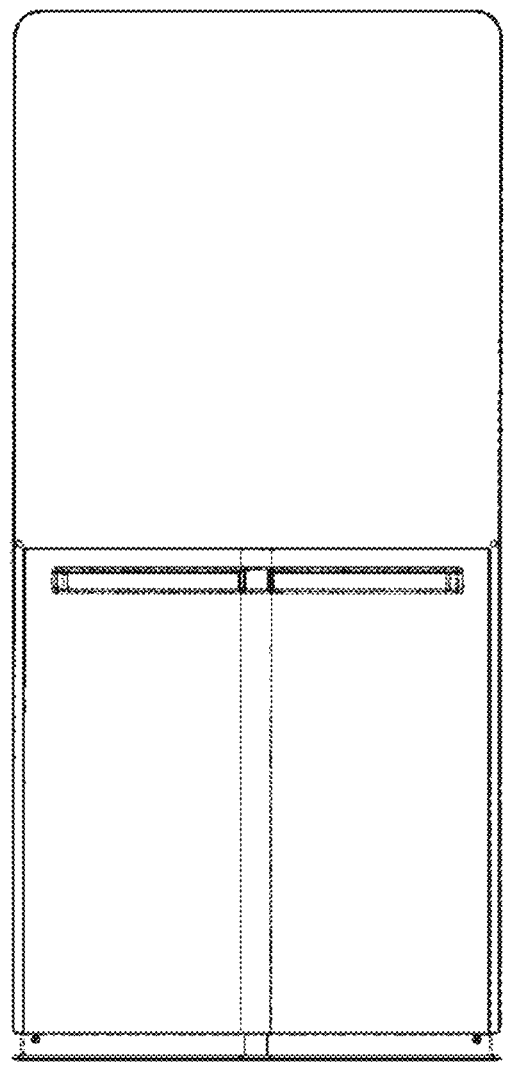
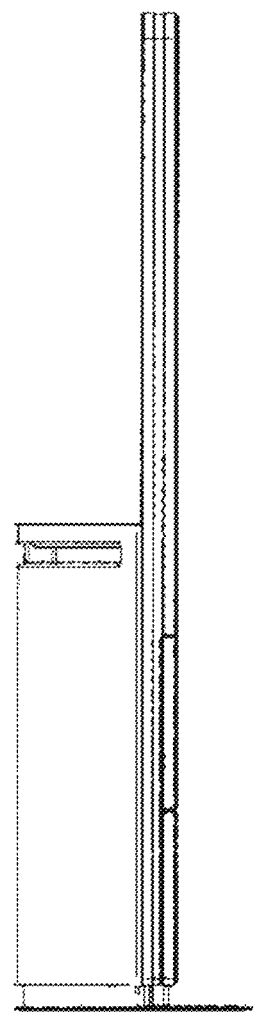

IMAGE FORMING APPARATUS AND IMAGE FORMING SYSTEM INCORPORATING SAME

CROSS-REFERENCE TO RELATED APPLICATIONS

This patent application is based on and claims priority pursuant to 35 U.S.C. § 119(a) to Japanese Patent Application Nos. 2016-138572, filed on Jul. 13, 2016, and 2017-089750, filed on Apr. 28, 2017 in the Japan Patent Office, the entire disclosure of each of which is hereby incorporated by reference herein.

BACKGROUND

Technical Field

Aspects of the present disclosure relate to an image forming apparatus and an image forming system incorporating the image forming apparatus.

Related Art

An image forming apparatus is known that includes a display to display a preview image on a display screen before an image is formed on a recording medium, and forms the image corresponding to the preview image displayed on the display screen onto the recording medium.

SUMMARY

In an aspect of the present disclosure, there is provided an image forming apparatus that includes a display and an image forming unit. The display includes a display screen to display a preview image before an image is formed on a recording medium. The image forming unit forms, on the recording medium, an image corresponding to the preview image displayed on the display screen. Each of a vertical length and a horizontal length of the display screen is equal to or greater than a length of a long side of a maximum size recording medium on which an image is to be formed by the image forming unit.

In another aspect of the present disclosure, there is provided an image forming system that includes the image forming apparatus and an image display apparatus. The image forming apparatus is coupled with the image display apparatus, to form an image displayed on a display of the image display apparatus, onto a recording medium with the image forming unit.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein:

FIG. 40 is a rear side view of the example of FIG. 39;

FIG. 41 is a left side view of the example of FIG. 39;

Figure 1:
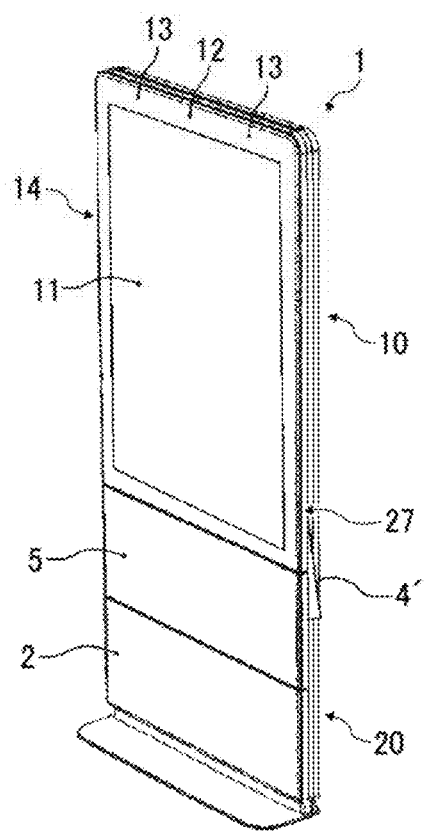
FIG. 1 is a perspective view of an image forming apparatus seen from a front side thereof in an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

As used herein, the singular forms "a", "an", and "the" are intended to include the plural forms as well, unless the context clearly indicates otherwise.

Although the embodiments are described with technical limitations with reference to the attached drawings, such description is not intended to limit the scope of the disclosure and all of the components or elements described in the embodiments of this disclosure are not necessarily indispensable.

Figure 2:
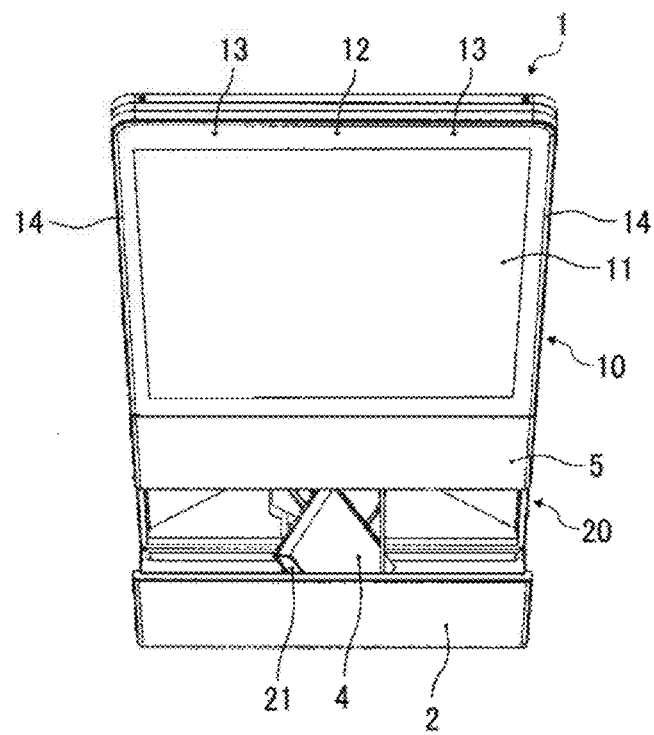
FIG. 2 is a perspective view of the image forming apparatus of FIG. 1 with a sheet replenishment cover opened, seen from diagonally above of the front side of the image forming apparatus.
Figure 3:
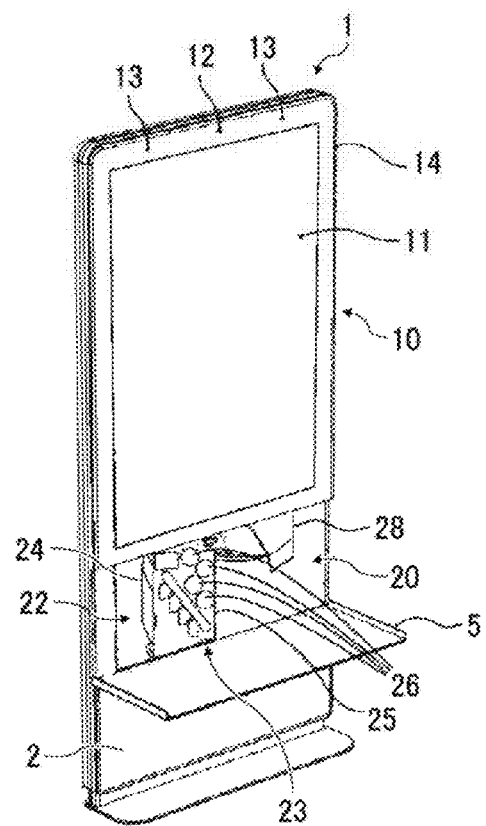
FIG. 3 is a perspective view of the image forming apparatus of FIG. 1 with an openable cover at the front side opened.
Figure 4:
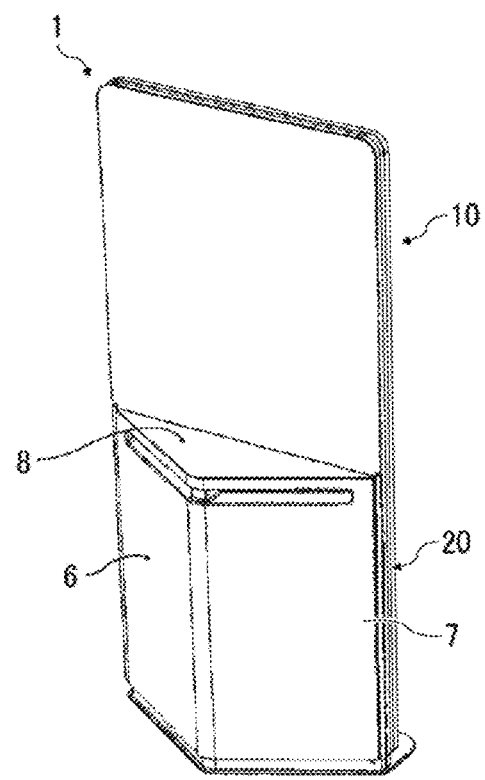
FIG. 4 is a perspective view of the image forming apparatus of FIG. 1, seen from the rear side thereof.

Below, a description is given of an image forming apparatus according to an embodiment of the present disclosure. FIG. 1 is a perspective view of the image forming apparatus seen from a front side thereof in the present embodiment. FIG. 2 is a perspective view of the image forming apparatus of FIG. 1 with a sheet replenishment cover opened, seen from diagonally above of the front side. FIG. 3 is a perspective view of the image forming apparatus of FIG. 1 with a front cover at the front side opened. FIG. 4 is a perspective view of the image forming apparatus of FIG. 1 seen from a rear side thereof.

The image forming apparatus 1 according to the present embodiment includes a display 10 and an image forming unit 20. The display 10 is substantially rectangular and short in depth. The display 10 is disposed at an upper part of the image forming apparatus 1. The image forming unit 20 is disposed at a lower part of the image forming apparatus 1. The display 10 includes a touch panel 11 at the front side of the image forming apparatus 1. The touch panel 11 displays a preview image before an image is formed on a sheet 4 as a recording medium. The touch panel 11 functions as a control panel to operate the image forming apparatus 1. The preview image used herein means an image representing a state in which a target image would be printed on the sheet 4, for example, an image in winch an expected image is represented within an outline of the sheet.

The display screen of the touch panel 11 has a structure in which any of the vertical dimension (length) and the horizontal dimension (length) is equal to or greater than the length of a long side of a maximum size sheet on which an image can be formed with the image forming unit 20. The image forming apparatus 1 according to the present embodiment can form an image on the sheet 4 of, at maximum, Japan industrial standard A4 (hereinafter, A4 size). Therefore, the length of the long side of the maximum size sheet on which an image can be formed by the image forming unit 20 is 297 mm. However, the dimensions of the touch panel 11 are not limited to the A4 size. For example, when the maximum printable sheet size is JIS A3 (hereinafter, A3 size), the length of the maximum long side of the sheet size on which an image can be formed by the image forming unit 20 is 420 mm. Alternatively, when the maximum printable sheet size is JIS B3 (hereinafter, B3 size), the length of the long side of the maximum size sheet on which an image can be formed by the image forming unit 20 is 515 mm.

The vertical dimension of the display screen of the touch panel 11 in the present embodiment is set to about 1.5 times as long as the length of the long side of the maximum size sheet (the length of the long side of A4 size) on which an image can be formed by the image forming unit 20. The horizontal dimension of the display screen of the touch panel 11 in the present embodiment is set to about twice as long as the length of the long side of the maximum size sheet.

Each of the vertical dimension and the horizontal dimension of the display screen of the touch panel 11 is set to be greater than the length of the long side of the maximum size sheet on which an image can be formed by the image forming unit 20. Thus, as described later, an enlarged image, which is enlarged to be greater than the size (actual size) of an image to be printed on a sheet, can be displayed on the display screen of the touch panel 11.

The image forming unit 20 according to the present embodiment includes, for example, a sheet feeding unit 21, a sheet conveying unit 22, an imaging unit 23, a fixing unit 24, a toner supply unit 25 mounted with a toner container 26, a printed sheet stacker 28, and an ejection port 27 from which a printed sheet 4' is ejected. The sheet conveying unit 22 conveys sheets 4 one by one from a stack of sheets 4 loaded on the sheet feeding unit 21. The imaging unit 23 forms an image on the sheet 4 conveyed by the sheet conveying unit 22.

The imaging unit 23 according to the present embodiment employs a tandem image forming method according to electrophotography and can form a full color image with different color toners of, e.g., yellow (Y), magenta (M), cyan (C), and black (Bk). For example, after the surface of each of four photoconductors as latent image bearers is uniformly charged, the charged surface of each photoconductor is exposed according to original image data, so that an electrostatic latent image is formed on the surface of each photoconductor. The electrostatic latent images on the photoconductors are developed with the color toners to form toner images of the difference colors. The toner images are transferred onto the sheet 4 conveyed by the sheet conveying unit 22, to form a composite color image on the sheet 4. In the present embodiment, the image forming method of the imaging unit 23 is electrophotography. However, in some embodiments, any other image forming method, such as inkjet method, may be used.

The sheet 4', on which an image is formed by imaging unit 23, is sent to the fixing unit 24. The fixing unit 24 fixes the image on the sheet 4' through fixing process. The sheet 4' is stacked on the printed sheet stacker 28. As illustrated in FIG. 1, a portion of stacked sheets 4' projects from the ejection port 27 at a side face of the image forming apparatus 1. The printed sheet 4' ejected from the ejection port 27 is held in a state in which only a leading end of the printed sheet 4' is exposed from the ejection port 27. A user can take out the printed sheet 4' from the ejection port 27 by gripping and drawing the leading end of the printed sheet 4'.

The image forming apparatus 1 according to the present embodiment includes two openable covers, that is, the sheet replenishment cover 2 and a toner replenishment cover 5, at the front side of the image forming apparatus 1. As illustrated in FIG. 2, the sheet replenishment cover 2 disposed at a lower side of the front side is horizontally slidable toward the front side of the image forming apparatus 1. By drawing the sheet replenishment cover 2 toward the front side of the image forming apparatus 1, the sheet feeding unit 21 is exposed to the outside of the image forming apparatus 1, so that a user can set sheets 4 onto the sheet feeding unit 21.

Figure 5:
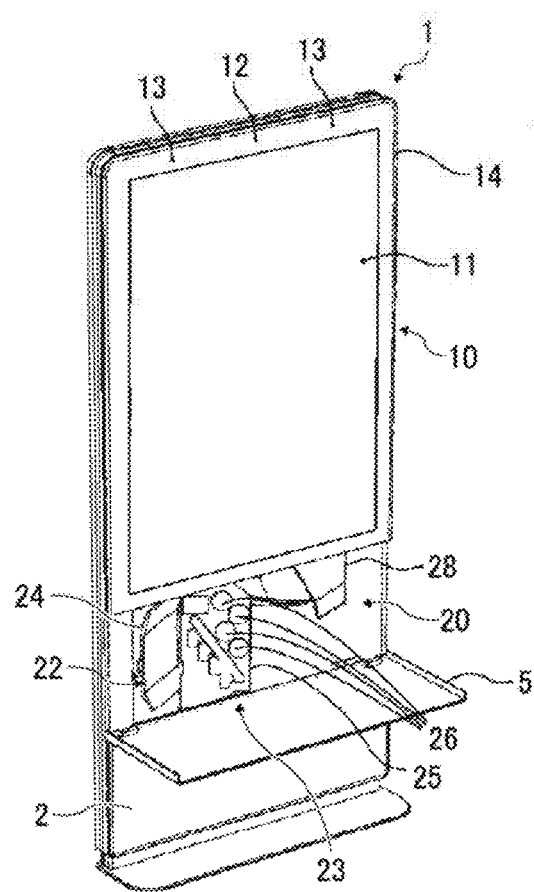
FIG. 5 is a perspective view of the image forming apparatus of FIG. 1 with a sheet conveying unit rotated.

As illustrated in FIG. 3, the toner replenishment cover 5 disposed above the sheet replenishment cover 2 is a door openable downward. By opening the toner replenishment cover 5, a user can access the toner supply unit 25 from the outside of the image forming apparatus 1. Accordingly, by opening the toner replenishment cover 5, the user can replace the toner container 26 with a new toner container. By opening the toner replenishment cover 5, the user can also access components of the image forming unit 20 from the outside of the image forming apparatus 1. Accordingly, the user can perform maintenance operation on, e.g., paper jam of the sheet conveying unit 22. As illustrated in FIG. 5, the sheet conveying unit 22 is openable to about 30° to facilitate the user's maintenance operation on, e.g., paper jam.

The rear side of the image forming apparatus 1 according to the present embodiment is covered with a lower rear cover a lower-rear-cover right slant face 6, a lower-rear-cover left slant face 7, and a lower-rear-cover top face 8 that constitute a lower rear cover. As illustrated in FIG. 4, the rear side of a lower part of the image forming apparatus 1 according to the present embodiment has a triangular prism shape formed by the lower-rear-cover right slant face 6, the lower-rear-cover left slant face 7, and the lower-rear-cover top face 8. All or a portion of the image forming unit 20 is housed inside the triangular prism shape.

In the present embodiment, the depth of the image forming apparatus 1 is smaller than twice of the length of a short side of a maximum size sheet on which an image can be formed with the image forming unit 20. That is, for the image forming apparatus 1 according to the present embodiment, as described above, since the maximum printable sheet size is A4 size, the length of the short side of a maximum size sheet on which an image can be formed with the image forming unit 20 is 210 mm. The dimension of the image forming unit 20 in the axial direction of the photoconductor is normally determined by the length of the short side of a maximum size sheet on which an image can be formed with the image forming unit 20. To set the depth of the image forming apparatus 1 to be smaller than twice of the length of the maximum short side, it would be difficult to arrange the image forming unit 20 so that the axial direction of the photoconductor matches the depth direction (front-and-rear direction) of the image forming apparatus 1.

Hence, in the present embodiment, the image forming unit 20 is arranged so that the axial direction of the photoconductor is tilted at an angle of about 60° relative to the depth direction of the image forming apparatus 1. A sheet conveyance path is twisted to extend from the fixing unit 24 to the ejection port 27. The image forming unit 20 is housed inside the triangular prism shape covered by the lower-rear-cover right slant face 6, the lower-rear-cover left slant face 7, and the lower-rear-cover top face 8.

Figure 6:
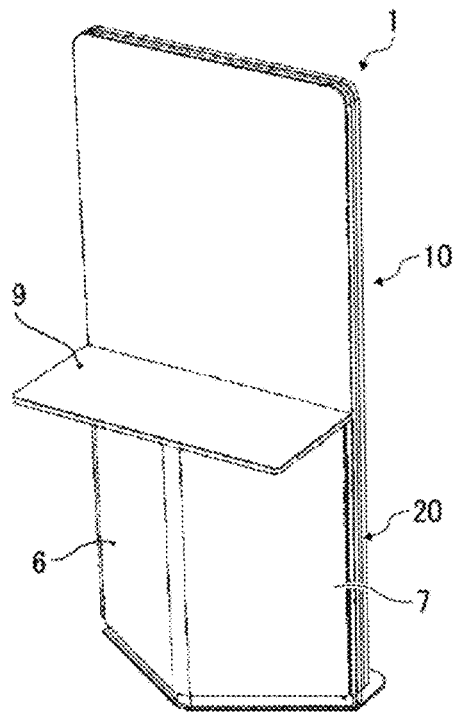
FIG. 6 is a perspective view of an example of the image forming apparatus of FIG. 1 with a top board optionally mounted at the rear side of the image forming apparatus.

Note that, as illustrated in FIG. 6, a top board 9 may be optionally mounted on the lower-rear-cover top face 8 according to the present embodiment. Thus, at the rear side of the image forming apparatus 1, a table is formed with the top board 9, thus allowing a rear side space of the image forming apparatus 1 to be utilized for various uses with the table.

The image forming apparatus 1 according to the present embodiment includes a camera unit 12, a microphone unit 13, and a speaker unit 14. The camera unit 12 as a camera is disposed at an upper side of the front side of the image forming apparatus 1, to take an image in an imaging area at the front side of the image forming apparatus 1. A user can read an image of an original by holding the original over the imaging area of the camera unit 12, similarly with image reading devices, such as a flat head scanner and a sheet through scanner. In some embodiments, such an image reading device can be employed instead of the camera unit 12.

Figure 7:
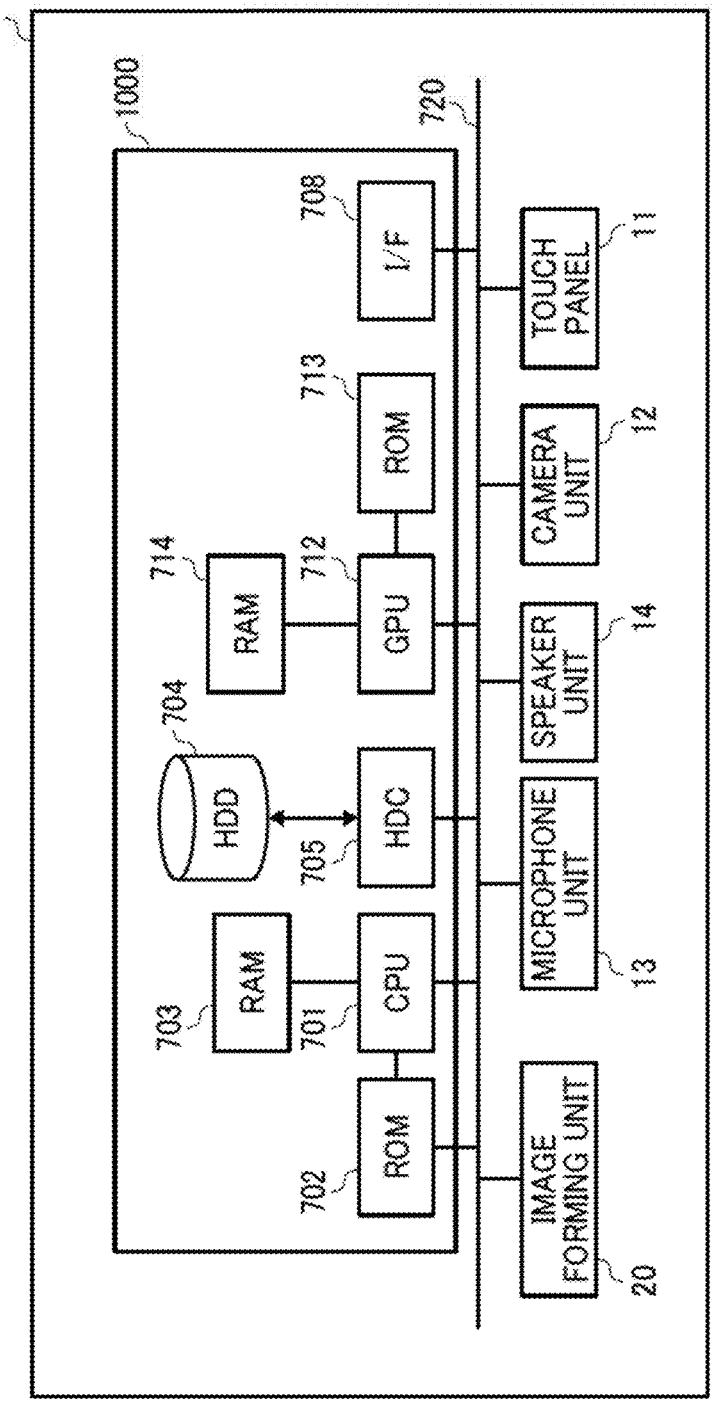
FIG. 7 is a block diagram of hardware configuration relating to main control of the image forming apparatus.

FIG. 7 is a block diagram of hardware configuration relating to main control of the image forming apparatus 1 according to the present embodiment. As illustrated in FIG. 7, the image forming apparatus 1 according to the present embodiment includes a controller 1000 in addition to the touch panel 11 constituting the display 10, the camera unit 12, the microphone unit 13, the speaker unit 14, and the image forming unit 20 as described above. The controller 1000 includes a central processing unit (CPU) 701, a read only memory (ROM) 702, a random access memory (RAM) 703, a hard disk drive (HDD) 704, a hard disk controller (HDC) 705, an external interface (I/F) 708, and a graphics processing unit (GPU) 712 that are connected via an extension bus line 720.

The CPU 701 generally controls the operation of the image forming apparatus 1. The ROM 702 stores programs used for processing of the CPU 701. The RAM 703 is used as a working area of the CPU 701. The HDD 704 stores programs and various types of data. The HDC 705 controls reading and writing of various types of data from and to the HDD 704 according to the control of the CPU 701. The I/F 708 sends and receives data to and from an external device via a wired or wireless communication network. The GPU 712 is connected to a ROM 713 and a RAM 714, to execute various types of image processing. The ROM 713 stores a program used for driving the GPU 712. The RAM 714 is used as a working area of the GPU 712. The extension bus line 720 includes, e.g., an address bus and a data bus electrically connected to the above-described components.

The touch panel 11 can detect a position at which a detection target, such as a user's finger or stylus, contacts or approaches on the display screen. The method of detection is not limited to any particular method but may be any suitable method. In response to e.g., the position (touch position) of the detection target detected with the touch panel 11 or a temporal change (movement) of the touch position, the CPU 701 executes, e.g., display control of an image displayed on the display screen of the touch panel 11. For example, the CPU 701 executes display control to display an image at the touch position on the display screen of the touch panel 11 and display a character or figured drawn by a trajectory of the image on the display screen. Alternatively, for example, in response to the touch position or movement on the display screen of the touch panel 11, the CPU 701 executes display control, such as movement, rotation, switch, enlargement, or reduction of an image displayed on the display screen.

For example, the GPU 712 executes image processing, such as removal of an image portion (e.g., background or a user's finger) other than the original and collection of distortion, on image data of the original taken and read with the camera unit 12. The GPU 712 also executes, for example, image processing to generate an added image (e.g., handwritten image) according to coordinate data of the touch position detected with the touch panel 11, and executes display control to superimpose the handwritten image on an image having already displayed on the display screen of the touch panel 11 to display an superimposed image.

The camera unit 12 can not only read an original as described above but also take static images, such as a user's face and scenery, and moving images. The microphone unit 13 allows recording of users' conversations. From an external device (e.g., a mobile terminal) connected through the I/F 708 or a portable recording medium, the image forming apparatus 1 can also read image data of an original to display an image on the touch panel 11 and print the image on the sheet 4 with the image forming unit 20. The display screen of the touch panel 11 is preferably made of a material, such as glass, on which ink is easily erasable, so that an image can be written on the display screen with ink by, e.g., an ink pen for white board. Note that, when the image forming apparatus 1 is used as a white board, it is preferable to enhance the visibility of an ink image mitten by, e.g., an ink pen by, for example, displaying a white plain image on the display screen of the touch panel 11.

Figure 8:
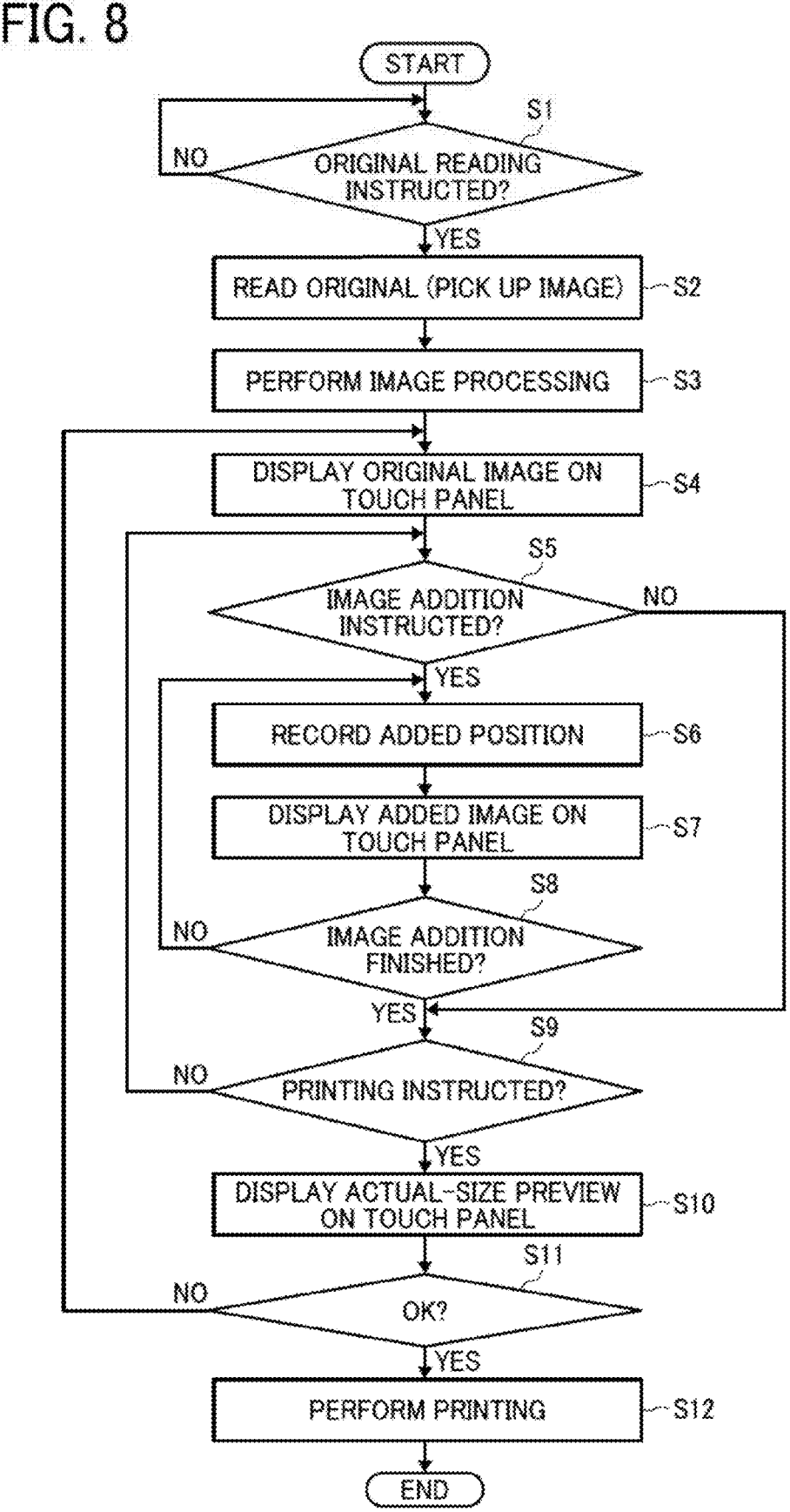
FIG. 8 is a flowchart of an example of processing performed with the image forming apparatus.
Figure 9:
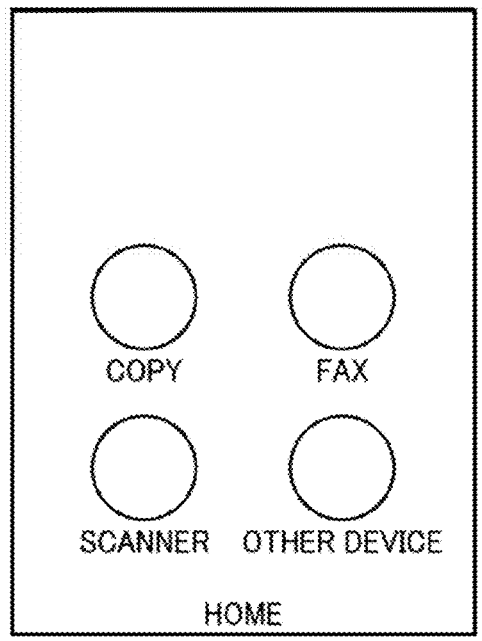
FIG. 9 is an illustration of an example of a home screen displayed on a display screen of a touch panel of the image forming apparatus.
Figure 10:
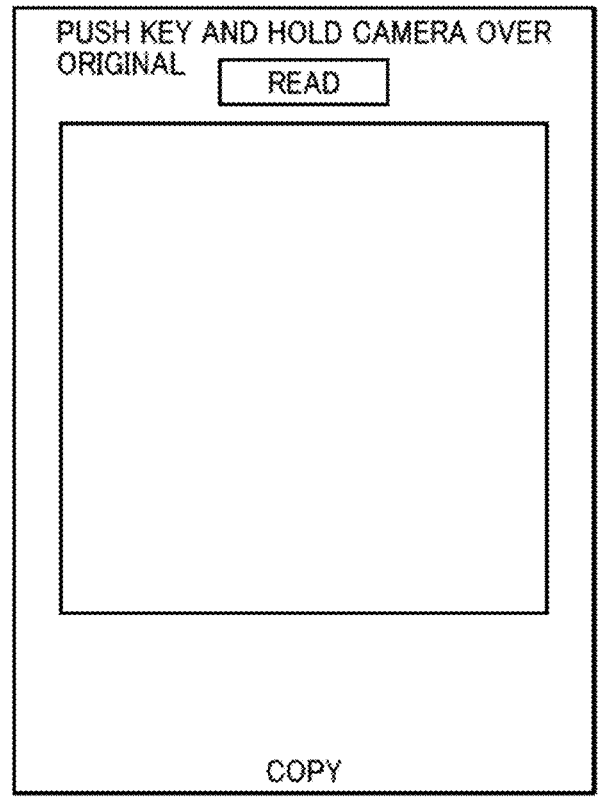
FIG. 10 is an illustration of an example of a screen before imaging when a copying function is selected by touching a "Copy" key on the home screen displayed on the display screen of FIG. 9.
Figure 11:
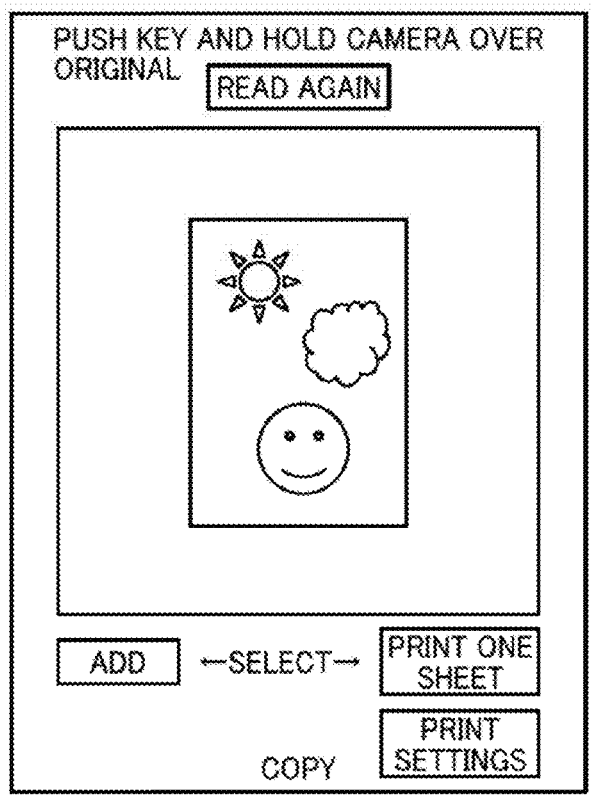
FIG. 11 is an illustration of an example of a screen displayed on the display screen when an original of A4 size in portrait orientation is imaged with the copying function selected.

FIG. 8 is a flowchart of an example of processing with the image forming apparatus 1. FIGS. 9 to 20 are illustrations of examples of various types of screens displayed on the touch panel 11. When the image forming apparatus 1 is activated, first, for example, a home screen illustrated in FIG. 9 is displayed on the display screen of the touch panel 11. Here, when a key image for selecting copying function is touched (S1), the display of the touch panel 11 shifts to a copy screen illustrated in FIG. 10 and the camera unit 12 is activated. On the copy screen, an image taken by the camera unit 12 is displayed. When the user holds an original over the imaging area of the camera unit 12, as illustrated in FIG. 11, an image of the original taken by the camera unit 12 is displayed on a preview area of the copy screen. When the user touches a "Read" key on the copy screen, the camera unit 12 executes imaging operation after a predetermined setting time of period (for example, two seconds) has elapsed (S2).

The GPU 712 performs image processing, such as removal of an image portion (e.g., background or a user's finger) other than the original or correction of distortion, on the image data thus taken (S3). Such data having been subjected to image processing is read as original image data. The GPU 712 displays the original image data on the display screen of the touch panel 11 (S4). The display control may be performed so that an original image of the same size (actual size) as an image size on a sheet on which an original, which the user holds over the camera unit 12, is printed (that is, an image size corresponding to the size of the sheet on which an image can be formed) is displayed on the display screen of the touch panel 11. Alternatively, an original image may be enlarged to and displayed at the maximum size that can be displayed on the display screen of the touch panel 11.

The size of a sheet on which an original is printed may be the same as the sheet size of the original. For example, after the key image for selecting the copying function is touched (S1), the sheet size to be printed may be set by a user.

Figure 12:
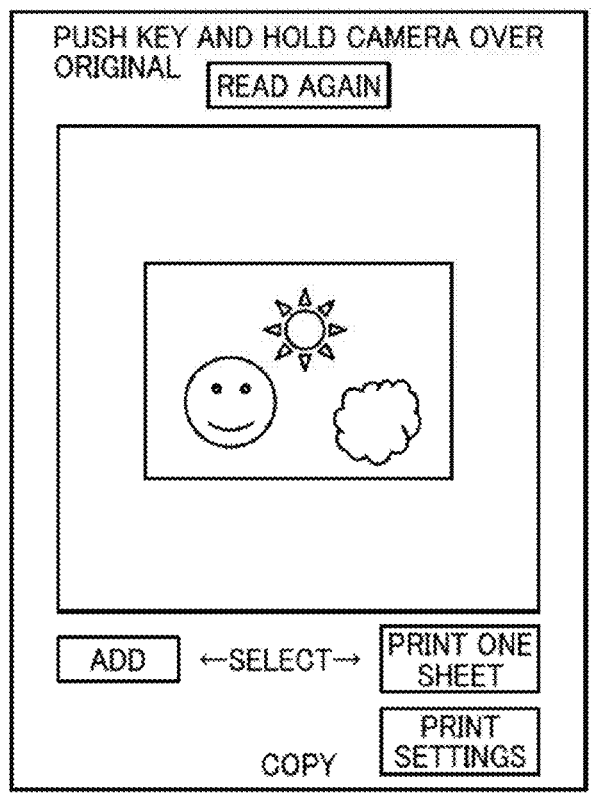
FIG. 12 is an illustration of an example of a screen displayed on the display screen when an original of A4 size in landscape orientation is imaged with the copying function selected.

Note that, as illustrated in FIG. 11, if a "Read again" key is touched on the copy screen, the image forming apparatus 1 can read the original again (take an image with the camera unit 12). In FIG. 11, an example is illustrated in which an original of A4 size in a portrait orientation is read as an original image and the original image is displayed in a proper orientation and actual size on the display screen of the touch panel 11. Examples of the image displayed on the display screen of the touch panel 11 are not limited to the example of FIG. 11. In the present embodiment, as illustrated in FIG. 12, even when an original of A4 size in a landscape orientation is read as an original image, the original image can be displayed in a proper orientation and actual size on the display screen of the touch panel 11

When the user prints the original image displayed on the display screen of the touch panel 11, the user touches a "Print one sheet" key on the copy screen (NO at S5 and YES at S9). Accordingly, the original image (print target image) displayed on the display screen of the touch panel 11 is previewed on the display screen of the touch panel 11 in the same size as (actual size of) the image size after the original image is printed on the sheet 4 (S10). Since each of the vertical dimension and the horizontal dimension of the display screen is equal to or greater than the length of a maximum long side of a sheet on which an image can be formed, the entire preview image in actual size can be displayed rather than the preview image of the actual size is partially enlarged and displayed on the display screen. In the preview display, for the example illustrated in FIG. 11, a print target image to be formed on the sheet 4 of A4 size in portrait orientation is previewed in proper orientation and actual size on the display screen of the touch panel 11. In the present embodiment, like the example illustrated in FIG. 12, a print target image to be formed on the sheet 4 of A4 size in landscape orientation can be previewed in proper orientation and actual size on the display screen of the touch panel 11.

After checking the preview image displayed in actual size on the touch panel 11 (the expected image after the original image is printed on the sheet 4), the user performs instruction operation to execute printing (S11). Accordingly, the image data of the print target image is sent to the image forming unit 20. In the image forming unit 20, an image is printed on the sheet 4 of A4 size according to the image data (S12). The printed sheet 4' is ejected from the ejection port 27, and copying is completed. Note that, by touching a "Print settings" key on the copy screen, print settings, such as print sheet size, the magnification of a print target image, and the number of print sheets, can be changed as needed. When the actual size is changed by changing the print sheet size, the magnification of the print target image, or the like in the print settings, the original image is previewed in the changed actual size on the display screen of the touch panel 11.

Figure 13:
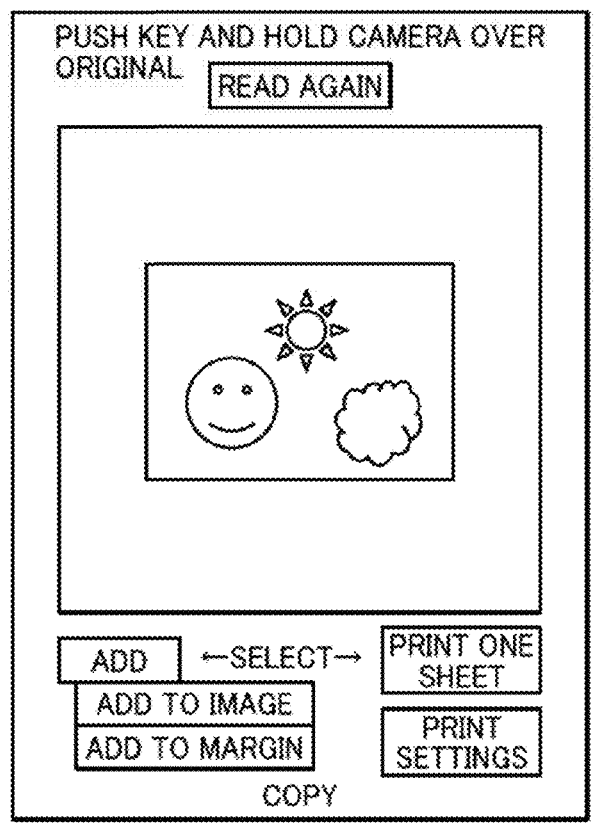
FIG. 13 is an illustration of an example of a screen displayed when an "Add" key is touched with the copying function selected.

In the present embodiment, the user can also print a composite image in which a handwritten image is added to an original image displayed on the display screen of the touch panel 11. In such a case, the user touches an "Add" key on the copy screen (YES at S5). Accordingly, as illustrated in FIG. 13, a pull-down menu for selecting the type of addition is displayed. The user touches an "Add to image" key to add a handwritten image into the original image or an "Add to margin" key to add a handwritten image to a margin area of the original image.

Figure 14:
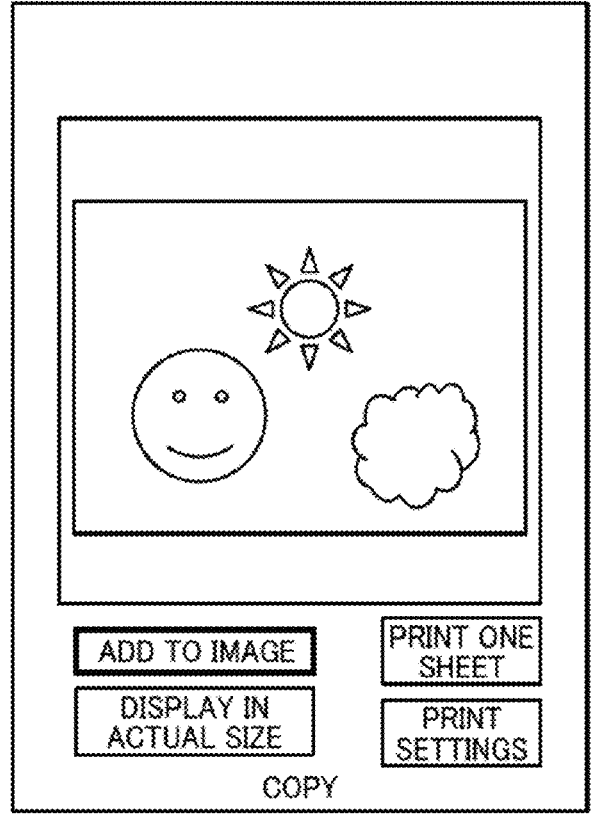
FIG. 14 is an illustration of an example of an enlarged display when an "Add to image" key is touched with the copying function selected.

Here, when the user touches the "Add to image" key, as illustrated in FIG. 14, the original image displayed in actual size is enlarged and displayed to facilitate the addition of the handwritten image into the original image. At this time, as illustrated in FIG. 14, the notation of the "Add" key is changed to the notation of "Add to image" and a "Display in actual size" key is displayed below the original image. When the user touches the "Display in actual size" key, the original image currently displayed is displayed in actual size and the "Display in actual size" key is changed to a "Zoom up" key. The "Display in actual size" key and the "Zoom up" key are alternately toggled.

Figure 15:
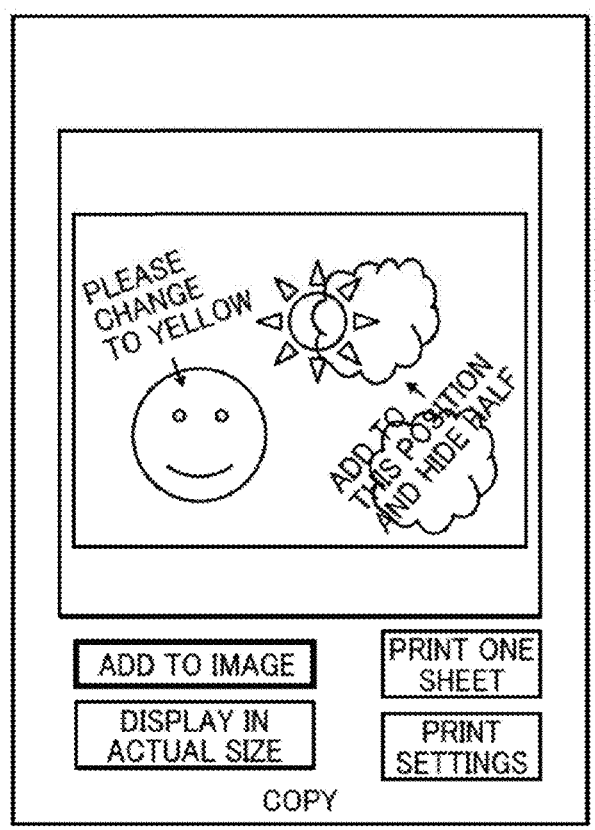
FIG. 15 is an illustration of an example of an enlarged display of an image in which a handwritten image is added into an original image with the copying function selected.

When the user touches the enlarged original image displayed on the touch panel 11 with, e.g., a finger, the touch panel 11 detects the touch position and records the coordinate data of the touch position (S6). Based on the coordinate data, the added image (handwritten image) is created. As illustrated in FIG. 15, the CPU 701 executes display control to superimpose the handwritten image on the image already displayed on the display screen of the touch panel 11 and display the superimposed image (S7). In the present embodiment, since the original image can be enlarged and displayed when an image is added to the original image, for example, thin lines or small characters, which might be difficult to be added in actual size, can be easily added to the original image.

Figure 16:
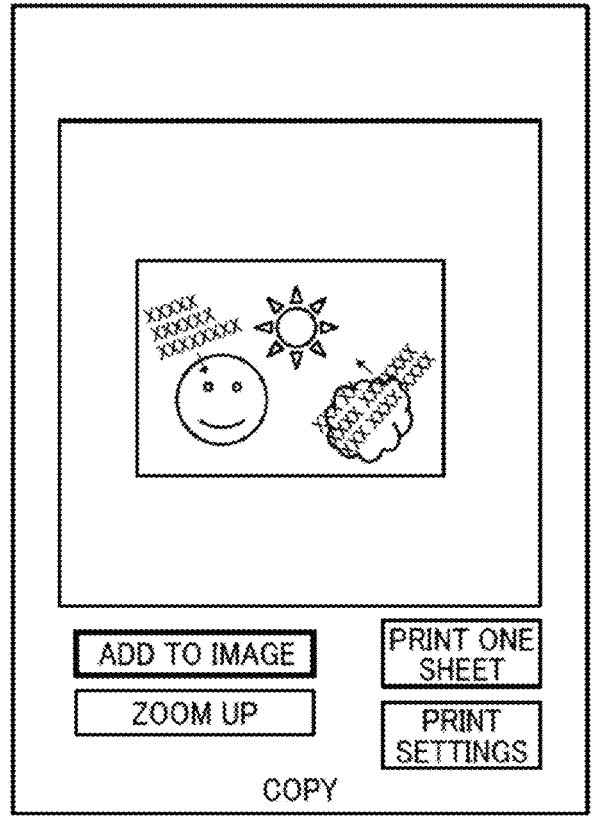
FIG. 16 is an illustration of an example of an actual-size display of an image in which a handwritten image is added into an original image with the copying function selected.

The user touches the "Display in actual size" key on the screen as needed. As illustrated in FIG. 16, the original image on which the added handwritten image is superimposed can be displayed in actual size and a post-addition image can be checked in actual size. Accordingly, the user can check whether the added handwritten image is too small to be visible. If the added handwritten image is too small, the user can touch the "Zoom up" key on the screen and enlarge and display the superimposed image, in which the handwritten image is superimposed on the original image. After the user performs an operation to delete the handwritten image, the user can add another handwritten image to the original image again.

When the user prints a post-addition image in which the handwritten image is added to the original image as described above, the user touches the "Print one sheet" key on the screen (YES at S8 and YES at S9). Accordingly, the post-addition image (print target image) displayed on the display screen of the touch panel 11 is previewed on the display screen of the touch panel 11 in the same size as (actual size of) the image size after the original image is printed on the sheet 4 (S10). After checking the preview image displayed in actual size on the touch panel 11, the user performs instruction operation to execute printing (S11). The image data of the print target image is sent to the image forming unit 20. Accordingly, in the image forming unit 20, an image is printed on the sheet 4 of A4 size according to the image data (S12) and the sheet 4' on which the post-addition image is printed is ejected from the ejection port 27.

Figure 17:
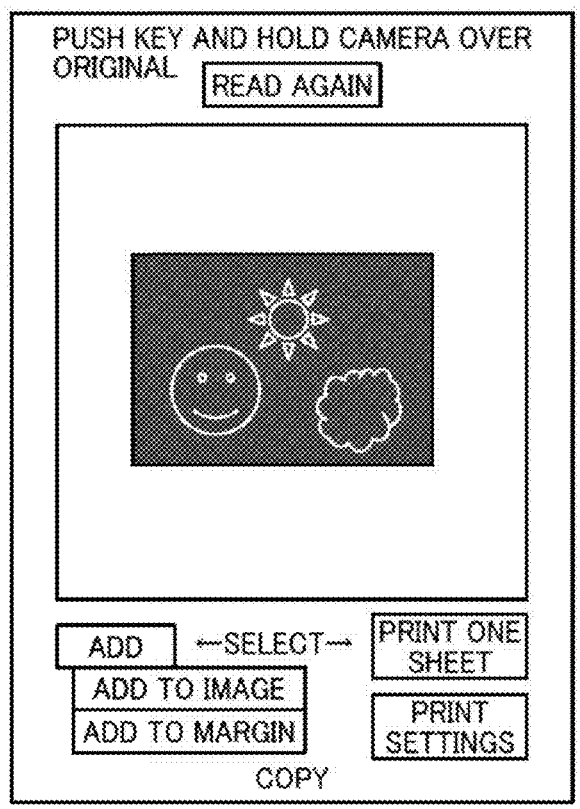
FIG. 17 is an illustration of an example of a screen when an "Add to margin" key is touched with the copying function selected.
Figure 18:
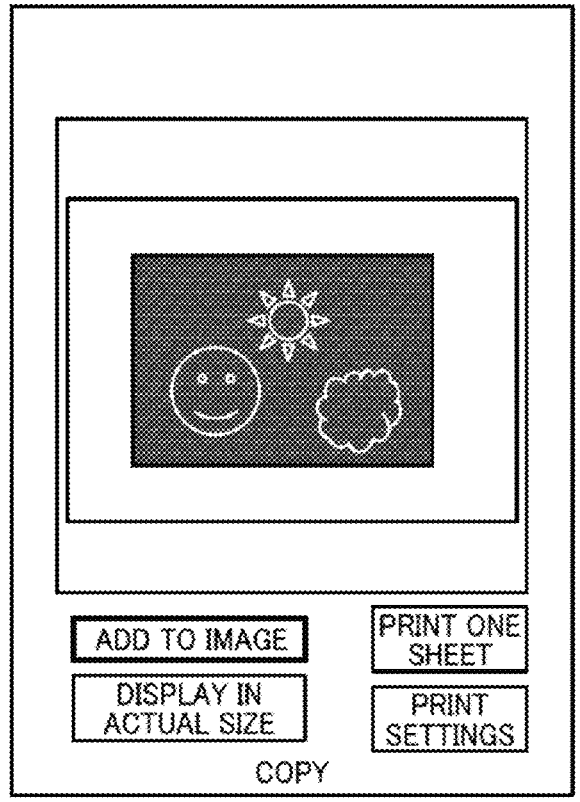
FIG. 18 is an illustration of an example of an enlarged display of an image of an entire sheet in which a margin area is displayed around an original image, when the "Add to margin" key is touched with the copying function selected.

Alternatively, as illustrated in FIG. 17, when the user touches the "Add to margin" key, an entire sheet image in which a margin area is displayed around the original image is enlarged and displayed. At this time, as illustrated in FIG. 18, the notation of the "Add" key is changed to the notation of "Add to margin" and the "Display in actual size" key is displayed below the original image. When the user touches the "Display in actual size" key, the currently-displayed entire sheet image is displayed in actual size and the "Display in actual size" key is changed to the "Zoom up" key. The "Display in actual size" key and the "Zoom up" key are alternately toggled.

Figure 19:
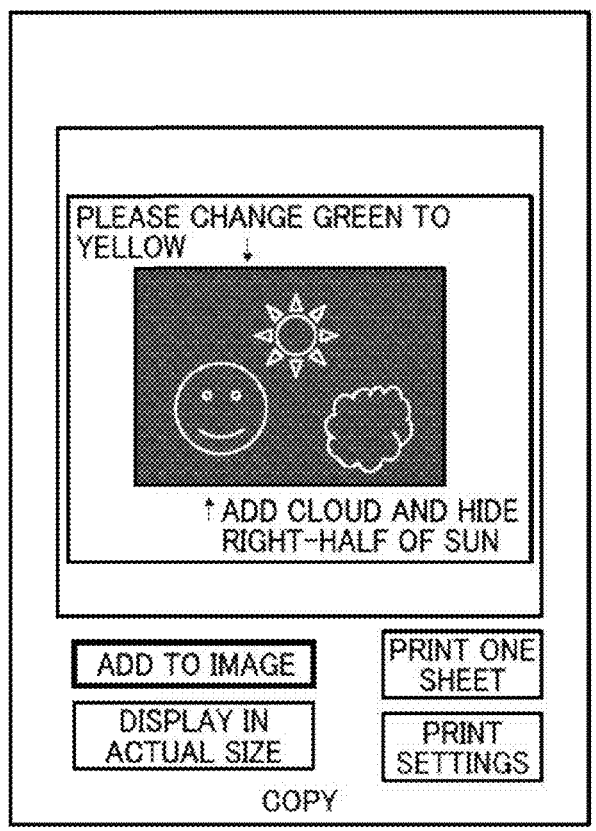
FIG. 19 is an illustration of an example of an enlarged display of an image in which a handwritten image is added into a margin area around an original image with the copying function selected.

When the user touches the margin area in the entire sheet image displayed on the touch panel 11 with, e.g., a finger, the touch panel 11 detects the touch position and records the coordinate data of the touch position (S6). Based on the coordinate data, the added image (handwritten image) is created. As illustrated in FIG. 19, the CPU 701 executes display control to superimpose the handwritten image on the margin area of the entire sheet image already displayed on the display screen of the touch panel 11 and display the superimposed image (S7).

Figure 20:
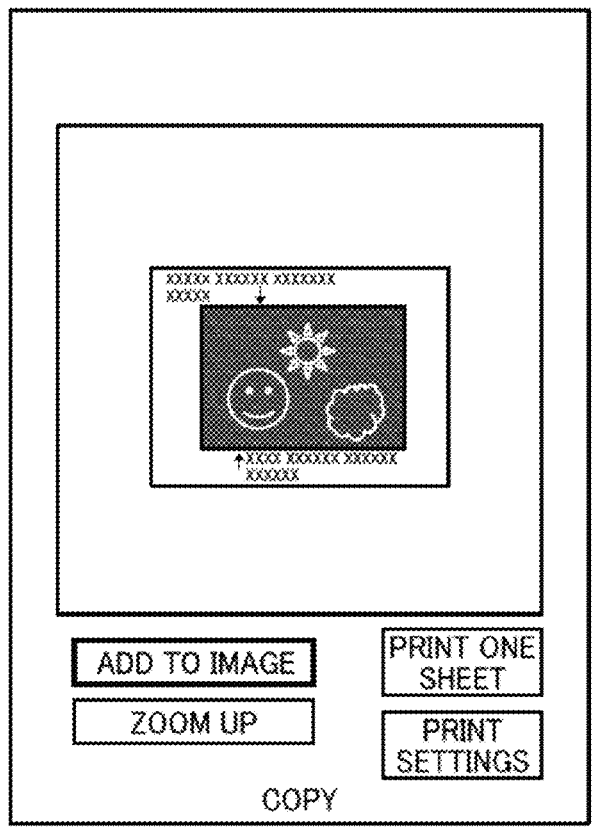
FIG. 20 is an illustration of an example of an actual-size display of an image in which a handwritten image is added into a margin area around an original image with the copying function selected.

The user touches the "Display in actual size" key on the screen as needed. As illustrated in FIG. 20, the entire sheet image on which the added handwritten image is superimposed can be displayed in actual size and the entire sheet image after addition can be checked in actual size. Accordingly, the user can check whether the added handwritten image is too small to be visible. If the added handwritten image is too small, the user can touch the "Zoom up" key on the screen and enlarge and display the entire sheet image, in which the handwritten image is superimposed on the margin area of the entire sheet image. After the user performs an operation to delete the handwritten image, the user can add another handwritten image to the margin-area of the entire sheet image again.

When the user prints a post-addition image in which the handwritten image is added to the original image as described above, the user touches the "Print one sheet" key on the screen (YES at S8 and YES at S9). Accordingly, the post-addition image (print target image) displayed on the display screen of the touch panel 11 is previewed on the display screen of the touch panel 11 in the same size as (actual size of) the image size after the original image is printed on the sheet 4 (S10). After checking the preview image displayed in actual size on the touch panel 11, the user performs instruction operation to execute printing (S11). The image data of the print target image is sent to the image forming unit 20. Accordingly, in the image forming unit 20, an image is printed on the sheet 4 of A4 size according to the image data (S12) and the sheet 4' on which the post-addition image is printed is ejected from the ejection port 27.

Note that the post-addition image can be stored as data into a portable recording medium and transmitted to an external device via a communication network without being printed. When the user performs instruction operation to select an ink-pen white board function, the image forming apparatus 1 according to the present embodiment uniformly displays the display screen of the touch panel 11 in white, thus allowing a user to use the image forming apparatus 1 as a white board. Handwritings with an ink pen on the display screen of the touch panel 11 can be previewed in actual size on the display screen of the touch panel 11 and printed by, for example, taking an image of the display screen of the touch panel 11 as image data with a camera device, such as a user's digital camera or smart phone, and sending the image data to the image forming apparatus 1. When the user performs instruction operation to select a teleconference function, a teleconference with other location via a communication network can be achieved with the camera unit 12, the microphone unit 13, and the speaker unit 14. In such a case, the original image displayed on the touch panel 11 and a post-addition image to which a handwritten image is added to the original image can be shared via the communication network.

In the present embodiment, the touch panel 11 has a large size. However, to prevent the image forming apparatus 1 from occupying an excessively large space, the display 10 including the touch panel 11 is disposed within a vertically-projected region of a lower part of the image forming apparatus 1 that houses the image forming unit 20. For example, if a front face of the lower part of the image forming apparatus 1 protrudes beyond the display screen of the touch panel 11, the accessibility and operability of a user with respect to the display screen of the touch panel 11 would be relatively low. Therefore, the display screen of the touch panel 11 is preferably substantially aligned with the front face of the lower part of image forming apparatus.

In the present embodiment, the image forming unit 20, which is heavier than the display 10, is disposed below the display 10. Such an arrangement lowers the position of the center of gravity of the entire image, forming apparatus 1, thus reducing turnover of the image forming apparatus 1.

Figure 21:
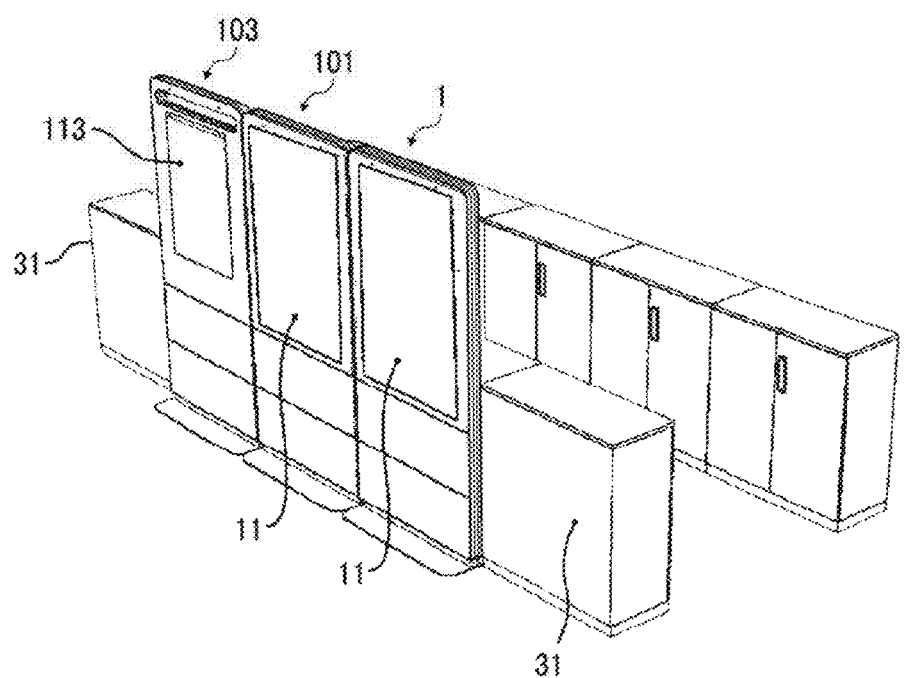
FIG. 21 is a perspective view of an example of use of the image forming apparatus of FIG. 1 seen from the front side thereof.
Figure 22:
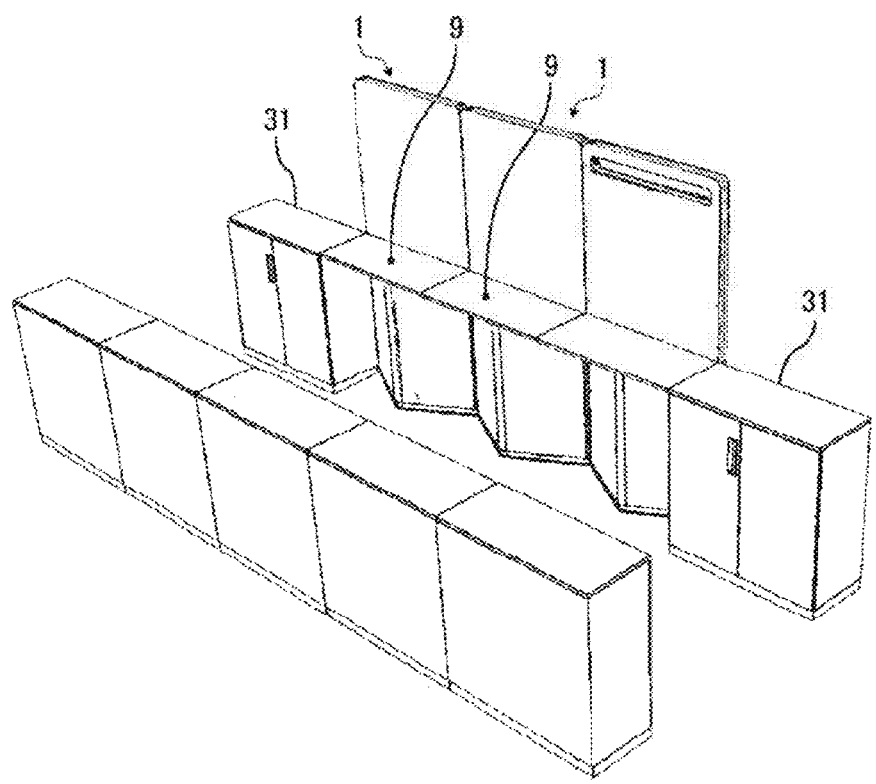
FIG. 22 is a perspective view of the example of use of FIG. 21 seen from the rear side of the image forming apparatus.

FIG. 21 is a perspective view of an example of use of the image forming apparatus 1 according to the present embodiment, seen from the front side of the image forming apparatus 1. FIG. 22 is a perspective view of the example of use of the image forming apparatus 1 of FIG. 21 seen from the rear side of the image forming apparatus 1. As described above, the image forming apparatus 1 according to the present embodiment optionally includes the top board 9 on the lower-rear-cover top face 8 at the rear side of the image forming apparatus 1. The top face of the top board 9 has a substantially same dimension as the dimension of a top face of a typical cabinet for office use, and has a substantially same height as the height of a typical cabinet for office use. Accordingly, when the image forming apparatus 1 according to the present embodiment is disposed along a row of cabinets 31, the top face of the row of the cabinets 31 can be a flat face, thus allowing enhancement of convenience.

Note that, in the example of use illustrated in FIGS. 21 and 22, a flip chart apparatus 103 having the same housing as a housing of the image forming apparatus 1 according to the present embodiment, an image display apparatus 101 as a peripheral device in which the image forming unit 20 is removed from the image forming apparatus 1 according to the present embodiment, and the image forming apparatus 1 according to the present embodiment are arranged in this order from the left side of FIG. 21 and coupled with each other to form a unit. Such coupling can reduce the turnover of the image forming apparatus 1.

Figure 23:
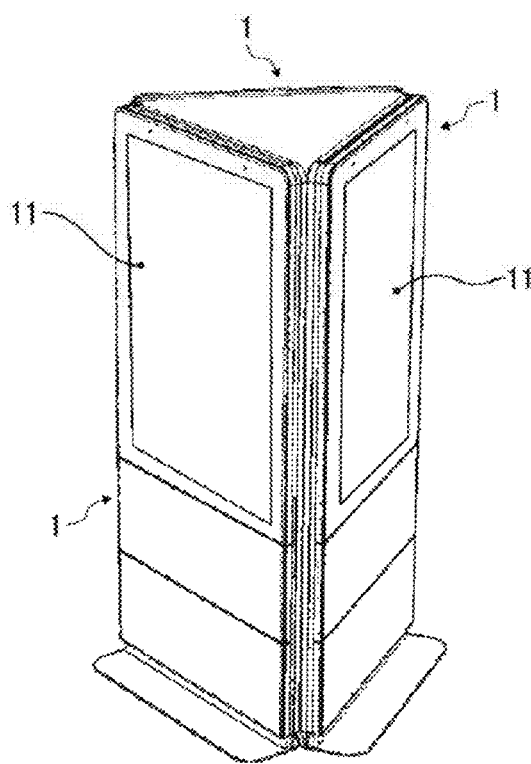
FIG. 23 is a perspective view of another example of use of the image forming apparatus of FIG. 1.

FIG. 23 is a perspective view of another example of use of the image forming apparatus 1 according to the present embodiment. As described above, the image forming apparatus 1 according to the present embodiment has a triangular prism shape at the rear side of the image forming apparatus 1. Accordingly, as illustrated in FIG. 23, the rear sides of the three image forming apparatuses 1 can be arranged to face each other. The image forming apparatuses 1 can be used in such a layout. This example of use is advantageous in reducing the turnover of the image forming apparatus 1. In particular, coupling the three image forming apparatuses 1 to each other can more effectively reduce the turnover.

In the present example of use, since the display screen of the touch panel 11 is visible from all directions, it is suitable for, e.g., signage and advertisement display in shops. Note that the number of the image forming apparatuses 1 is not limited to three, and the rear sides of four or more image forming apparatuses 1 may be arranged to face each other. For example, the rear sides of five or more image forming apparatuses 1 may be arranged to face each other to from a pentagonal prism shape. For the present example of use, the rear side of the image forming apparatus 1 is not limited to the triangular prism shape but may be, for example, a shape in which side edges of the rear side are chamfered.

Figure 24:
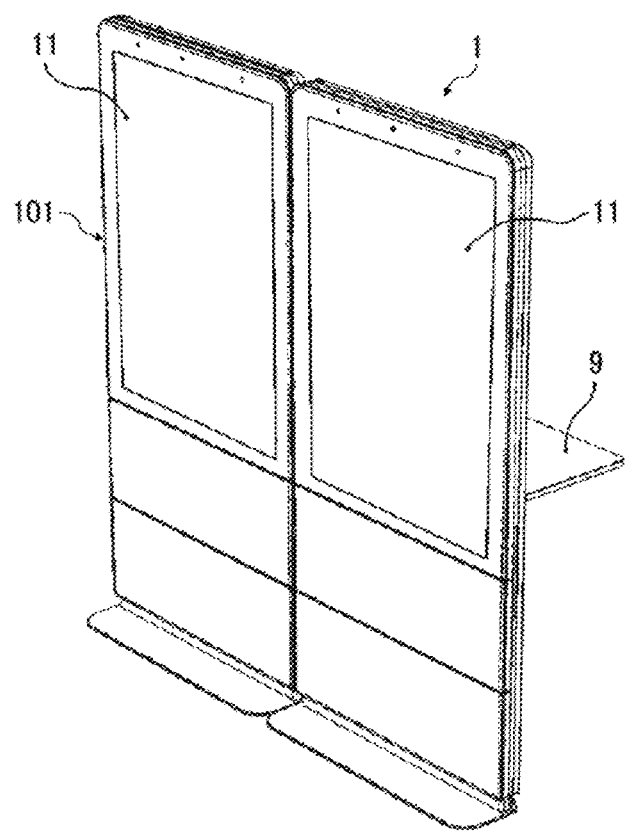
FIG. 24 is a perspective view of still another example of use of the image forming apparatus of FIG. 1.

FIG. 24 is a perspective view of still another example of use of the image forming apparatus 1 according to the present embodiment. In the present example of use, the image display apparatus 101 as a peripheral device in which the image forming unit 20 is removed from the image forming apparatus 1 according to the present embodiment is disposed at the left side of the image forming apparatus 1 according to the present embodiment. The image forming apparatus 1 and the image display apparatus 101 are coupled with each other and communicatively connected to each other. In the present example of use, the touch panel 11 of the image forming apparatus 1 and the touch panel 11 of the image display apparatus 101 can be used as a single screen to display a single image on the two touch panels 11. Accordingly, a greater print target image can be previewed. Separate images can also be displayed on the touch panel 11 of the image forming apparatus 1 and the touch panel 11 of the image display apparatus 101 independent of each other. The image forming apparatus 1 can separately print the images or collectively print the images onto a single sheet.

Figure 25:
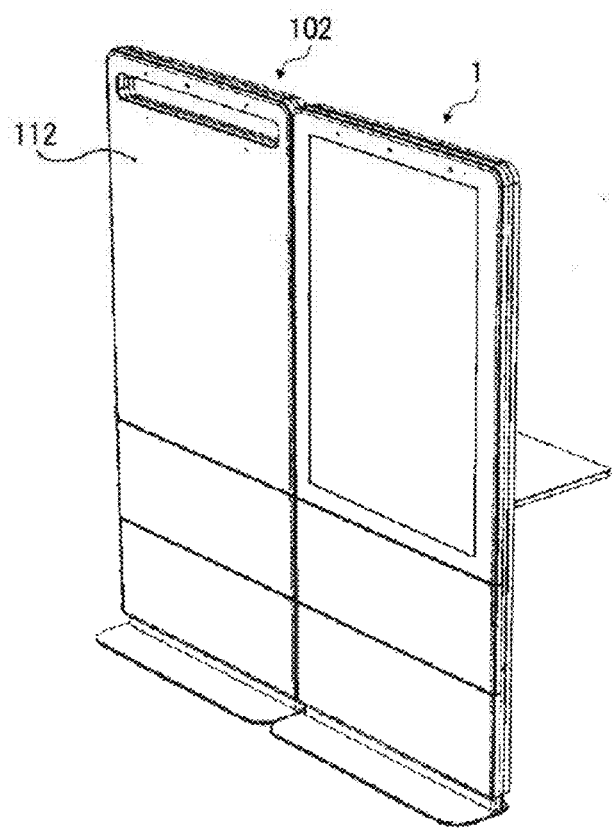
FIG. 25 is a perspective view of still yet another example of use of the image forming apparatus of FIG. 1.

FIG. 25 is a perspective view of still yet another example of use of the image forming apparatus 1 according to the present embodiment. In the present example of use, the white board apparatus 102 has the same housing as the housing of the image forming apparatus 1 according to the present embodiment is disposed at the left side of the image forming apparatus 1 according to the present embodiment. The image forming apparatus 1 and the white board apparatus 102 are coupled with each other. The white board apparatus 102 includes a white board 112 at a portion corresponding to the display screen of the touch panel 11 in the image forming apparatus 1 according to the present embodiment.

In the present example of use, for example, handwritings with an ink pen on the white board 112 of the white board apparatus 102 can be taken as image data with a camera device, such as a user's digital camera or smart phone, and the image data can be transmitted to the image forming apparatus 1. Thus, the handwritten image on the white board 112 can be previewed and printed. At this time, the handwritten image on the white board 112 and an image displayed on the display screen of the touch panel 11 of the image forming apparatus 1 can be aggregated into a single sheet, previewed on the display screen of the touch panel 11 of the image forming apparatus 1, and printed on the single sheet. In addition, after the handwritten image on the white board 112 or an aggregated image, in which the handwritten image on the white board 112 and the image displayed on the display screen of the touch panel 11 of the image forming apparatus 1 are aggregated into a single sheet, is previewed on the display screen of the touch panel 11 of the image forming apparatus 1, the user can add a handwritten image to the aggregated image as described above, and preview and print the added aggregated image.

Figure 26:
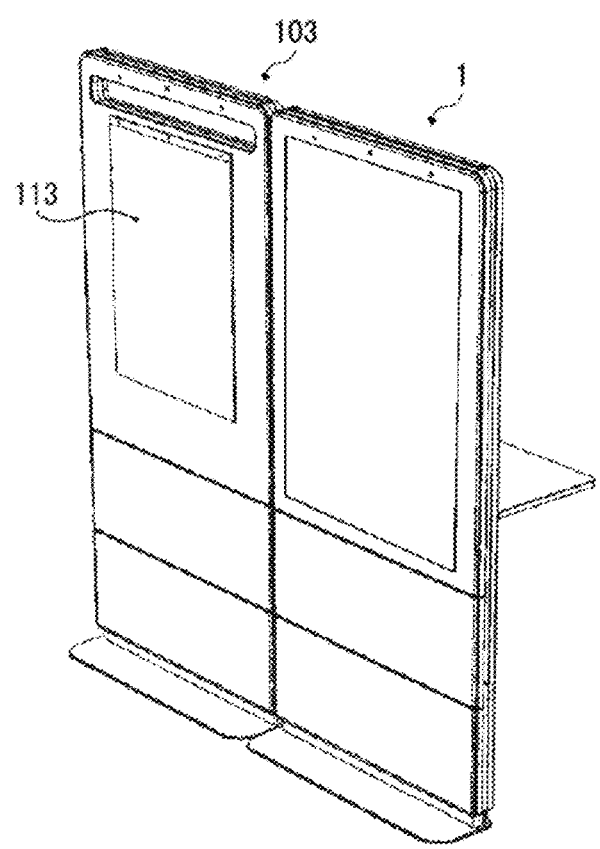
FIG. 26 is a perspective view of still further yet another example of use of the image forming apparatus of FIG. 1.

FIG. 26 is a perspective view of still further yet another example of use of the image forming apparatus 1 according to the present embodiment. In the present example of use, the flip chart apparatus 103 having the same housing as the housing of the image forming apparatus 1 according to the present embodiment is disposed at the left side of the image forming apparatus 1 according to the present embodiment. The image forming apparatus 1 and the flip chart apparatus 103 are coupled with each other. The flip chart apparatus 103 includes a flip chart 113 at a portion corresponding to the display screen of the touch panel 11 in the image forming apparatus 1 according to the present embodiment.

In the present example of use, for example, handwritings with an ink pen on the flip chart 113 of the flip chart apparatus 103 can be taken as image data with a camera device, such as a user's digital camera or smart phone, and the image data can be transmitted to the image forming apparatus 1. Thus, the handwritten image on the flip chart 113 can be previewed and printed. At this time, the handwritten image on the flip chart 113 and an image displayed on the display screen of the touch panel 11 of the image forming apparatus 1 can be aggregated into a single sheet, previewed on the display screen of the touch panel 11 of the image forming apparatus 1, and printed on the single sheet. In addition, after the handwritten image on the flip chart 113 or an aggregated image, in which the handwritten image on the flip chart 113 and the image displayed on the display screen of the touch panel 11 of the image forming apparatus 1 are aggregated into a single sheet, is previewed on the display screen of the touch panel 11 of the image forming apparatus 1, the user can add a handwritten image to the aggregated image as described above, and preview and print the added aggregated image.

Any of the peripheral devices, such as the image display apparatus 101, the white board apparatus 102, and the flip chart apparatus 103, used in the example of use illustrated in FIGS. 24 to 26 is a device in which the image forming unit 20 is removed from the image forming apparatus 1 according to the present embodiment, thus providing an extended screen at reasonable cost. Since images displayed or handwritten in the peripheral device can be printed with the image forming apparatus 1, it is not necessary to install the image forming unit 20 to the peripheral devices.

Figure 27:
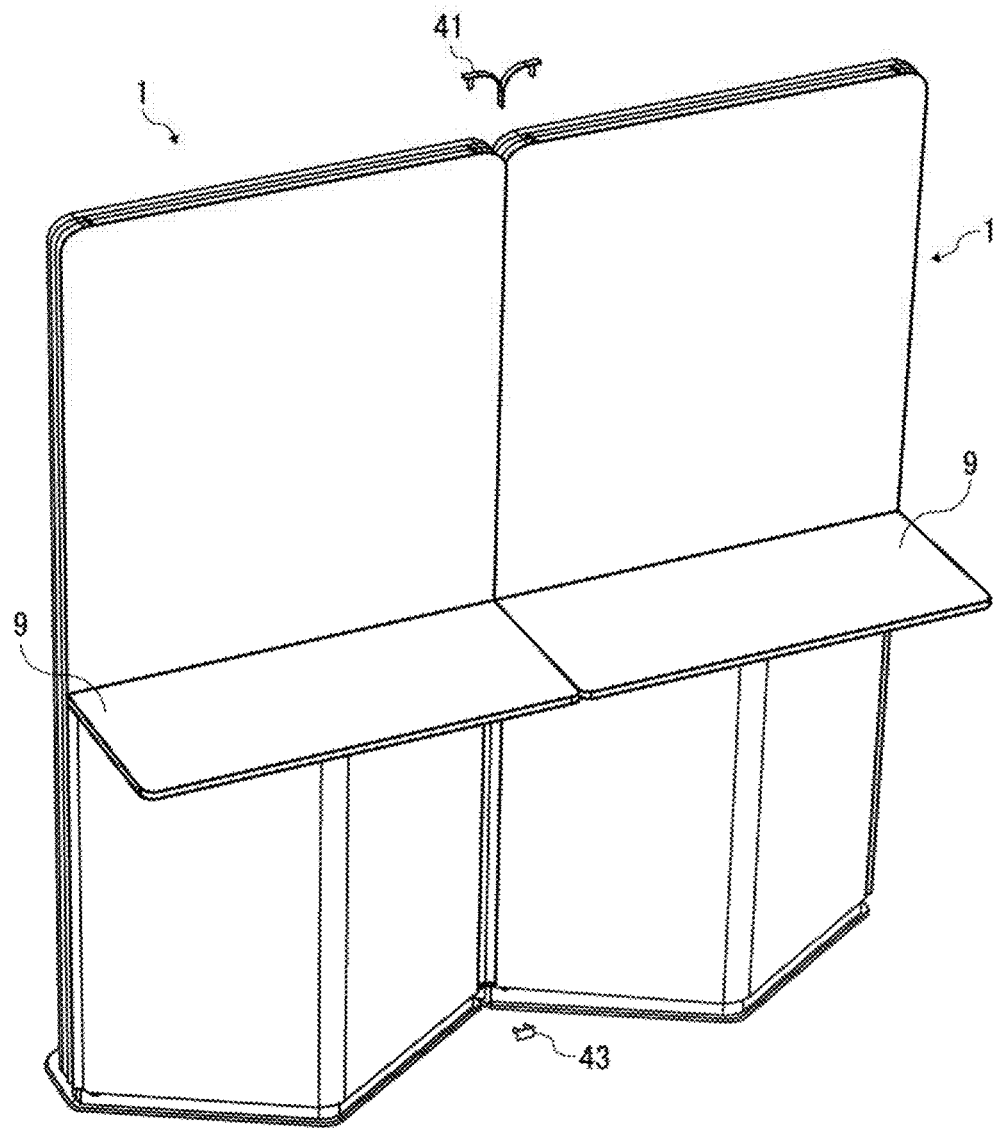
FIG. 27 is a rear perspective view of an example of a coupling mechanism to couple two image forming apparatuses.
Figure 28A:
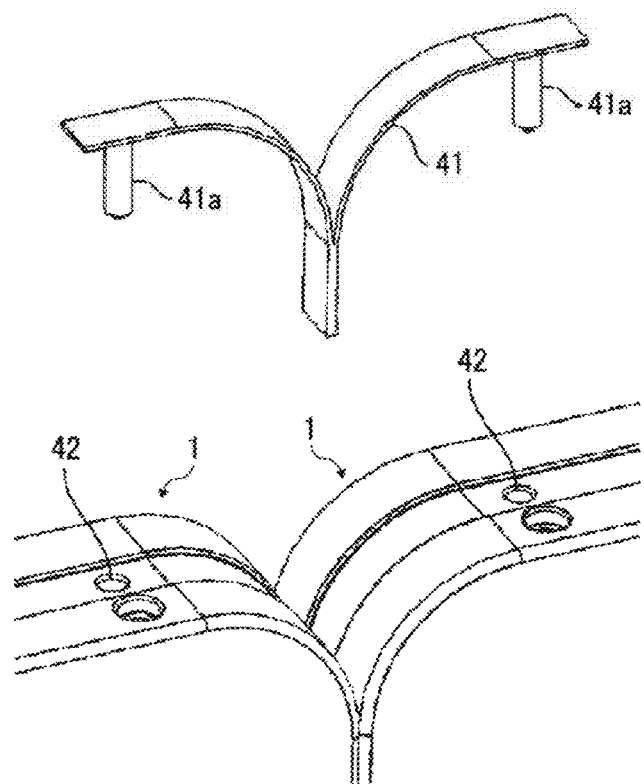
FIG. 28A is an enlarged perspective view of an upper coupling point of the two image forming apparatuses of FIG. 27 before coupling.
Figure 28B:
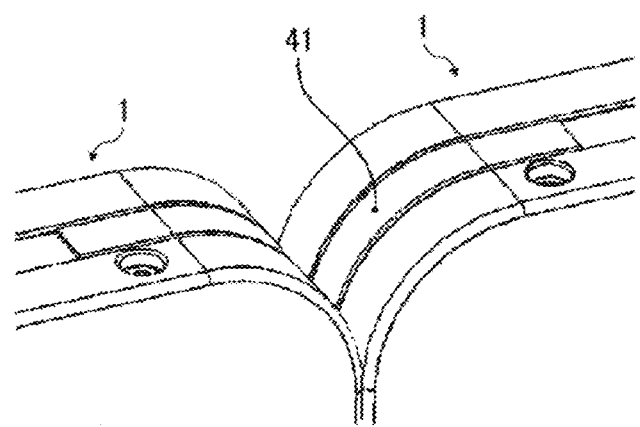
FIG. 28B is an enlarged perspective view of the upper coupling point of FIG. 28A after coupling.
Figure 29A:
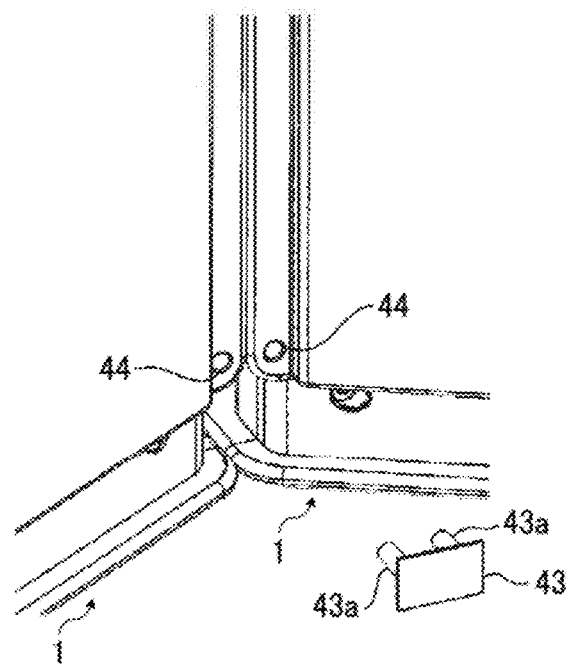
FIG. 29A is an enlarged perspective view of a lower coupling point of the two image forming apparatuses of FIG. 27 before coupling.
Figure 29B:
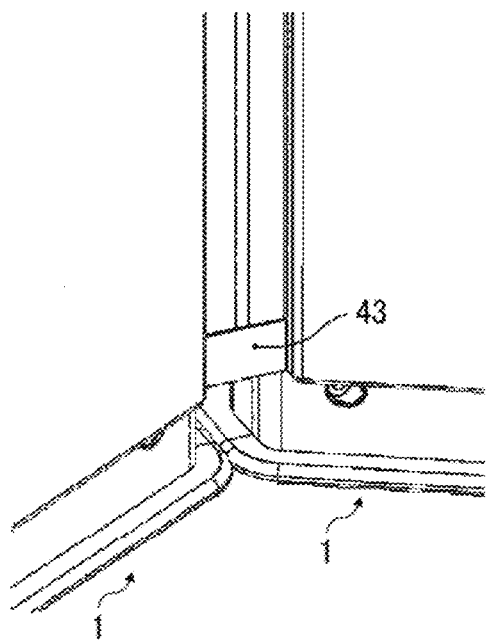
FIG. 29B is an enlarged perspective view of the lower coupling point of FIG. 29A after coupling.

FIG. 27 is a rear perspective view of an example of a coupling mechanism to couple two image forming apparatuses 1. FIG. 28A is an enlarged perspective view of an upper coupling point of the two image forming apparatuses 1 before coupling. FIG. 28B is an enlarged perspective view of the upper coupling point after coupling. FIG. 29A is an enlarged perspective view of a lower coupling point of the two image forming apparatuses 1 before coupling. FIG. 29B is an enlarged perspective view of the lower coupling point after coupling.

As illustrated, in FIG. 28A, the top face of the image forming apparatus 1 has top-face holes 42 for coupling. In a state in which the two image forming apparatuses 1 are arranged side by side, projections 41a of an upper coupler 41 are inserted into the top-face holes 42 of the two image forming apparatuses 1. Accordingly, as illustrated in FIG. 28B, the two image forming apparatuses 1 are coupled via the upper coupler 41.

Similarly, as illustrated in FIG. 29A, lower holes 44 for coupling are disposed at lower rear portions of the image forming apparatus 1. As illustrated in FIG. 29B, projections 43a of a lower coupler 43 are inserted into the lower holes 44 of the image forming apparatuses 1, thus coupling the two image forming apparatuses 1 via the lower coupler 43.

Note that, in the present example of use, the coupling mechanism of coupling the two image forming apparatuses 1 is described. However, in some embodiments, the coupling mechanism having a similar configuration may be used to couple the image forming apparatus 1 with a peripheral device, such as the image display apparatus 101, the white board apparatus 102, or the flip chart apparatus 103.

Variation 1

Figure 30:
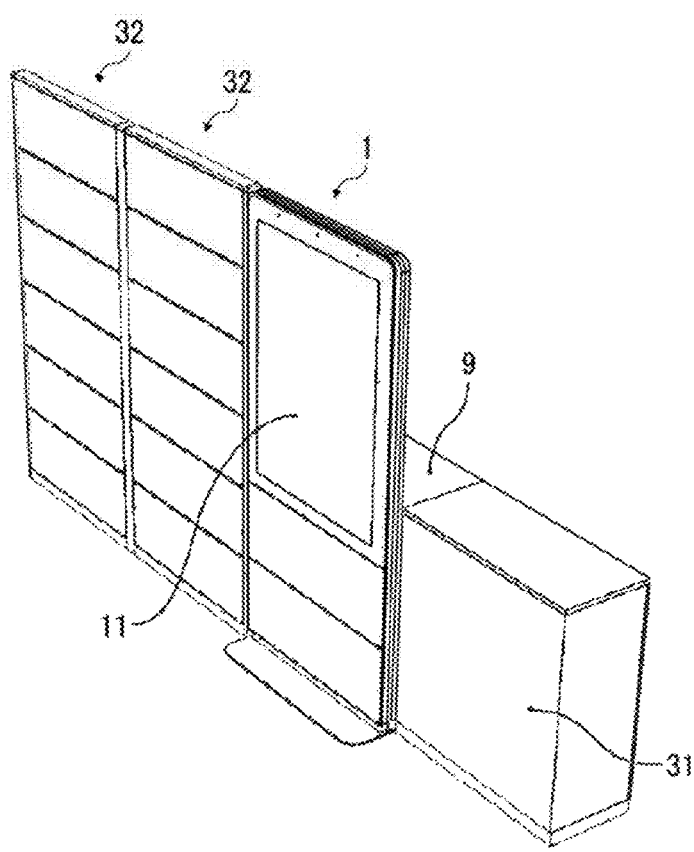
FIG. 30 is a perspective view of an example of use of the image forming apparatus according to a variation 1, seen from the front side thereof.
Figure 31:
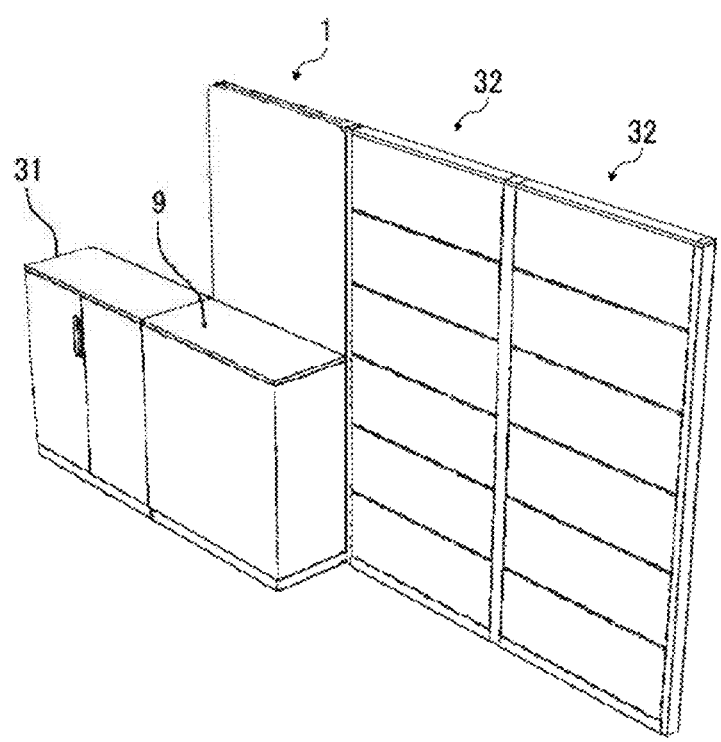
FIG. 31 is a perspective view of the example of use of FIG. 30 seen from the rear side of the image forming apparatus.

Next, a description is given of a variation (hereinafter, variation 1) of a rear shape of the image forming apparatus 1 in the present embodiment. FIG. 30 is a perspective view of an example of use of the image forming apparatus 1 according to the present variation 1, seen from the front side of the image forming apparatus 1. FIG. 31 is a perspective view of the example of use of the image forming apparatus 1 of FIG. 30 seen from the rear side of the image forming apparatus 1. For the image forming apparatus 1 according to the present variation 1, the rear shape to house the image forming unit 20 is not a triangular prism shape but a box shape. Such a configuration has less constraints in the layout of the image forming unit 20 to be housed in the box shape. For example, the image forming unit 20 may be arranged so that the axial direction of the photoconductor matches the depth direction (front-and-rear direction) of the image forming apparatus 1. The location of the ejection port 27 is not limited to the lateral side of the image forming apparatus 1 but may be disposed on, for example, the front or back side of the image forming apparatus 1. Accordingly, in the image forming apparatus 1 according to the present variation 1, the maximum printable sheet size is A3 size.

In the present variation 1, the top board 9 may be optionally mounted on the lower-rear-cover top face 8 of the rear side of the image forming apparatus 1. In such a case, when the image forming apparatus 1 according to the present embodiment is disposed along a row of cabinets 31, the top face of the row of the cabinets 31 can be a flat face, thus allowing enhancement of convenience.

Figure 32:
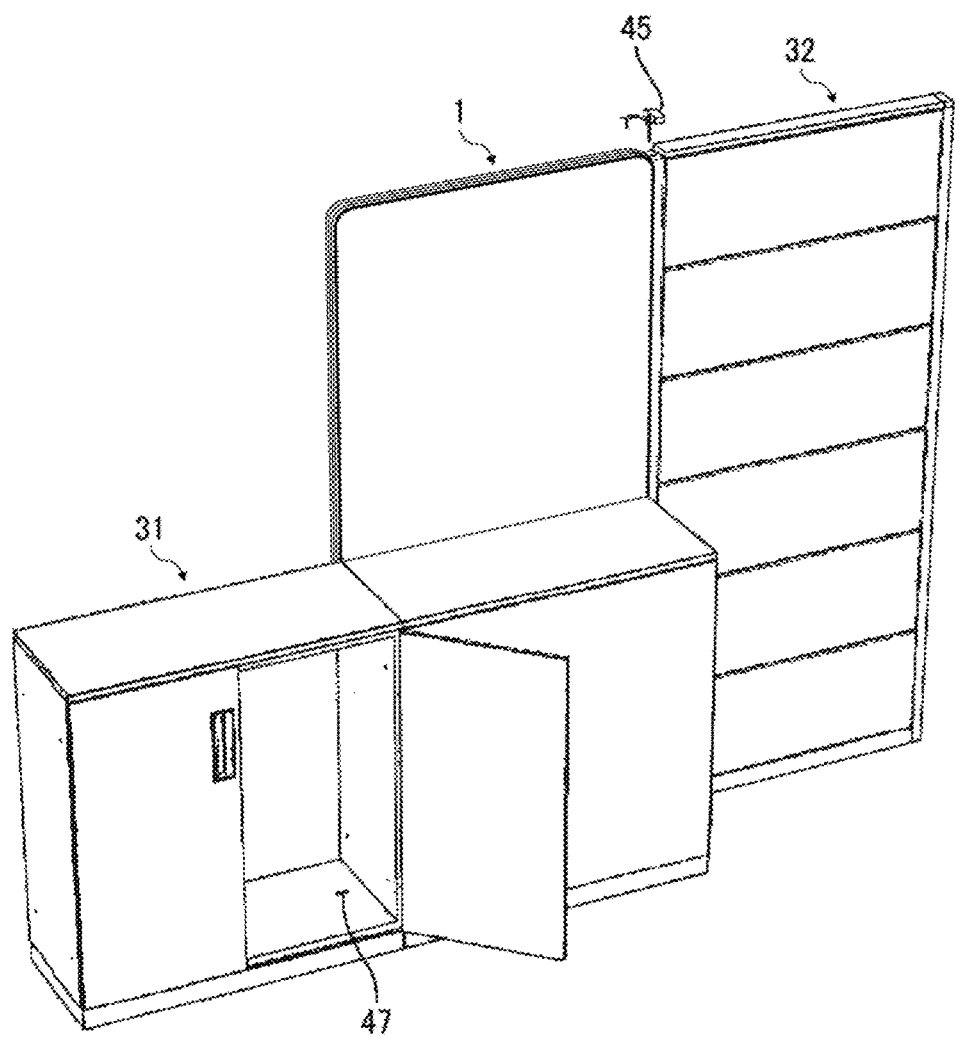
FIG. 32 is a rear perspective view of an example of a coupling mechanism to couple the image forming apparatus according to the variation 1 with a cabinet and a partition.
Figure 33A:
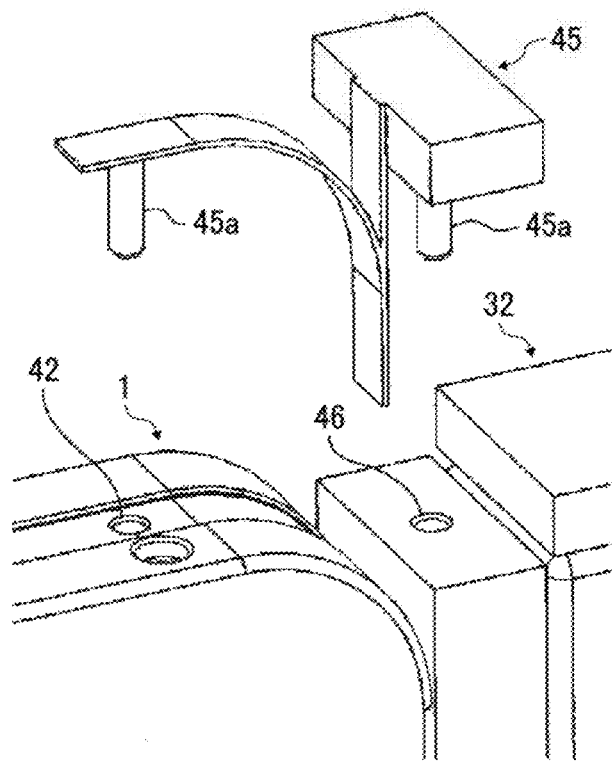
FIG. 33A is an enlarged perspective view of a coupling point of the image forming apparatus and the partition of FIG. 32 before coupling.
Figure 33B:
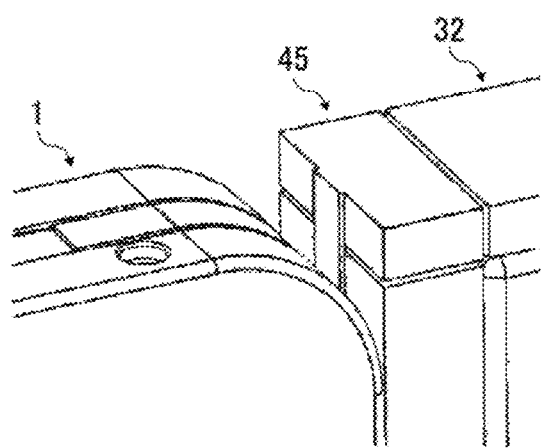
FIG. 33B is an enlarged perspective view of the coupling point of FIG. 33A after coupling.
Figure 34A:
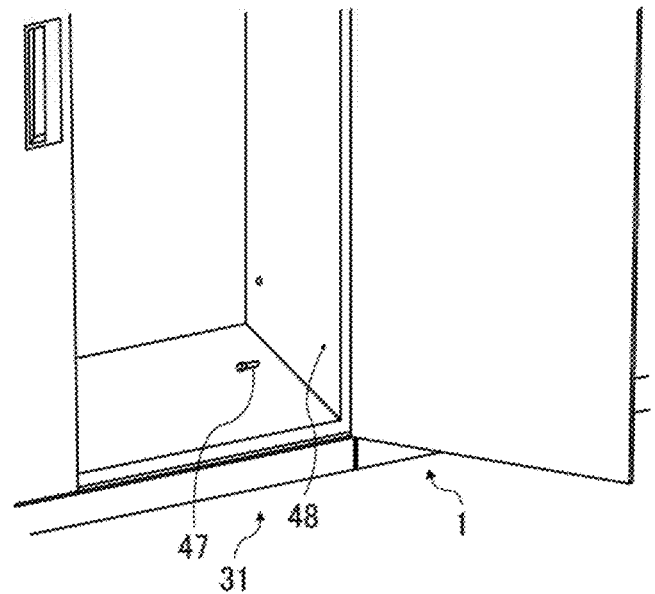
FIG. 34A is an enlarged perspective view of a coupling point of the image forming apparatus and the cabinet of FIG. 32 before coupling.
Figure 34B:
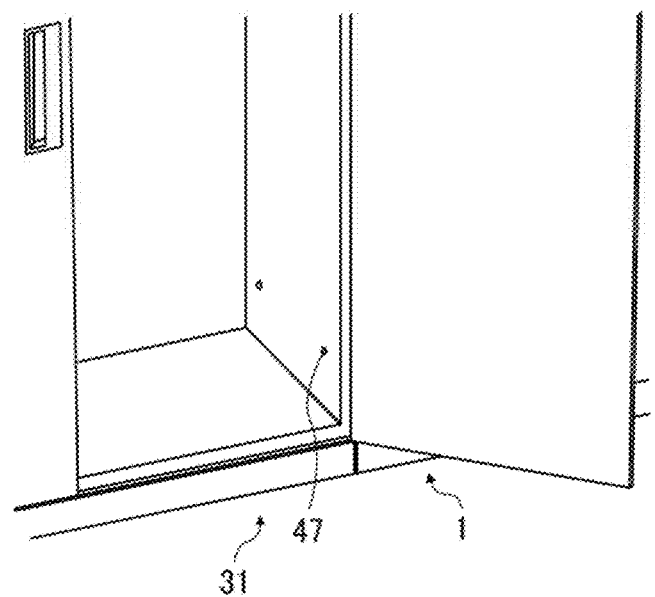
FIG. 34B is an enlarged perspective view of the coupling point of FIG. 34A after coupling.

FIG. 32 is a rear perspective view of an example of a coupling mechanism to couple the image forming apparatus 1 with the cabinet 31 and a partition 32. FIG. 33A is an enlarged perspective view of a coupling point of the image forming apparatus 1 and the partition 32 before coupling. FIG. 33B is an enlarged perspective view of the coupling point after coupling. FIG. 34A is an enlarged perspective view of a coupling point of the image forming apparatus 1 and the cabinet 31 before coupling. FIG. 34B is an enlarged perspective view of the coupling point after coupling.

As described above, the top-face holes 42 for coupling are disposed on the top face of the image forming apparatus 1. As illustrated in FIG. 33A, top-face holes 46 for coupling are disposed on the top face of the partition 32. In a state in which the image forming apparatus 1 and the partition 32 are arranged side by side, projections 45a of a coupler 45 are inserted into the top-face hole 42 of the image forming apparatus 1 and the top-face hole 46 of the partition 32. Accordingly, as illustrated in FIG. 33B, the image forming apparatus 1 and the partition 32 are coupled via the coupler 45.

As illustrated in FIG. 34A, side screw holes 48 for coupling are disposed at the lateral sides of the image forming apparatus 1 and the cabinet 31. In a state in which the image forming apparatus 1 and the cabinet 31 are arranged side by side, a coupling screw 47 is screwed into the side screw holes 48 of the image forming apparatus 1 and the cabinets 31, to fasten the image forming apparatus 1 and the cabinets 31. Accordingly, as illustrated in FIG. 34B, the image forming apparatus 1 and the cabinet 31 are coupled with the coupling screw 47.

Variation 2

Figure 35:
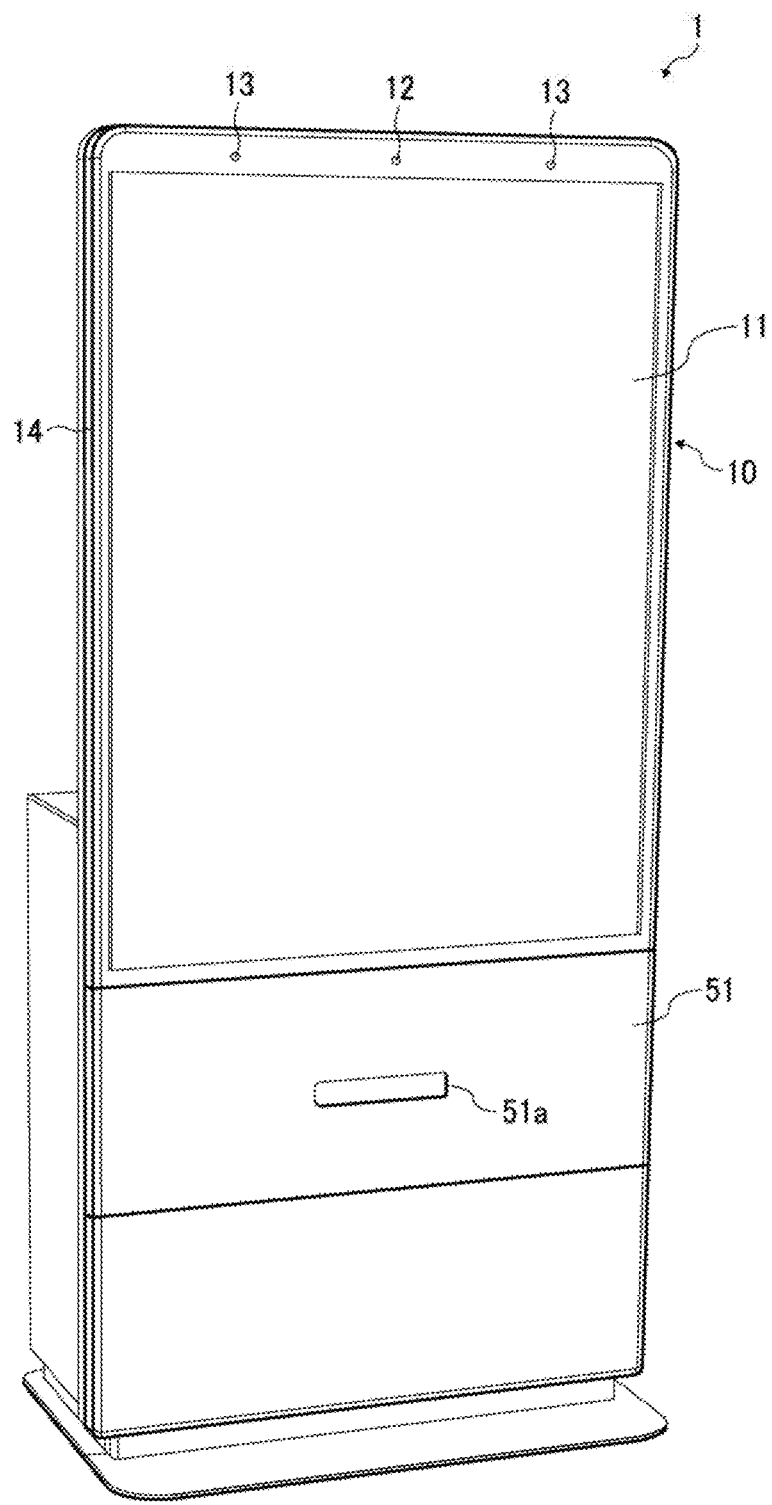
FIG. 35 is a perspective view of an outer appearance of the image forming apparatus according to a variation 2.
Figure 36:
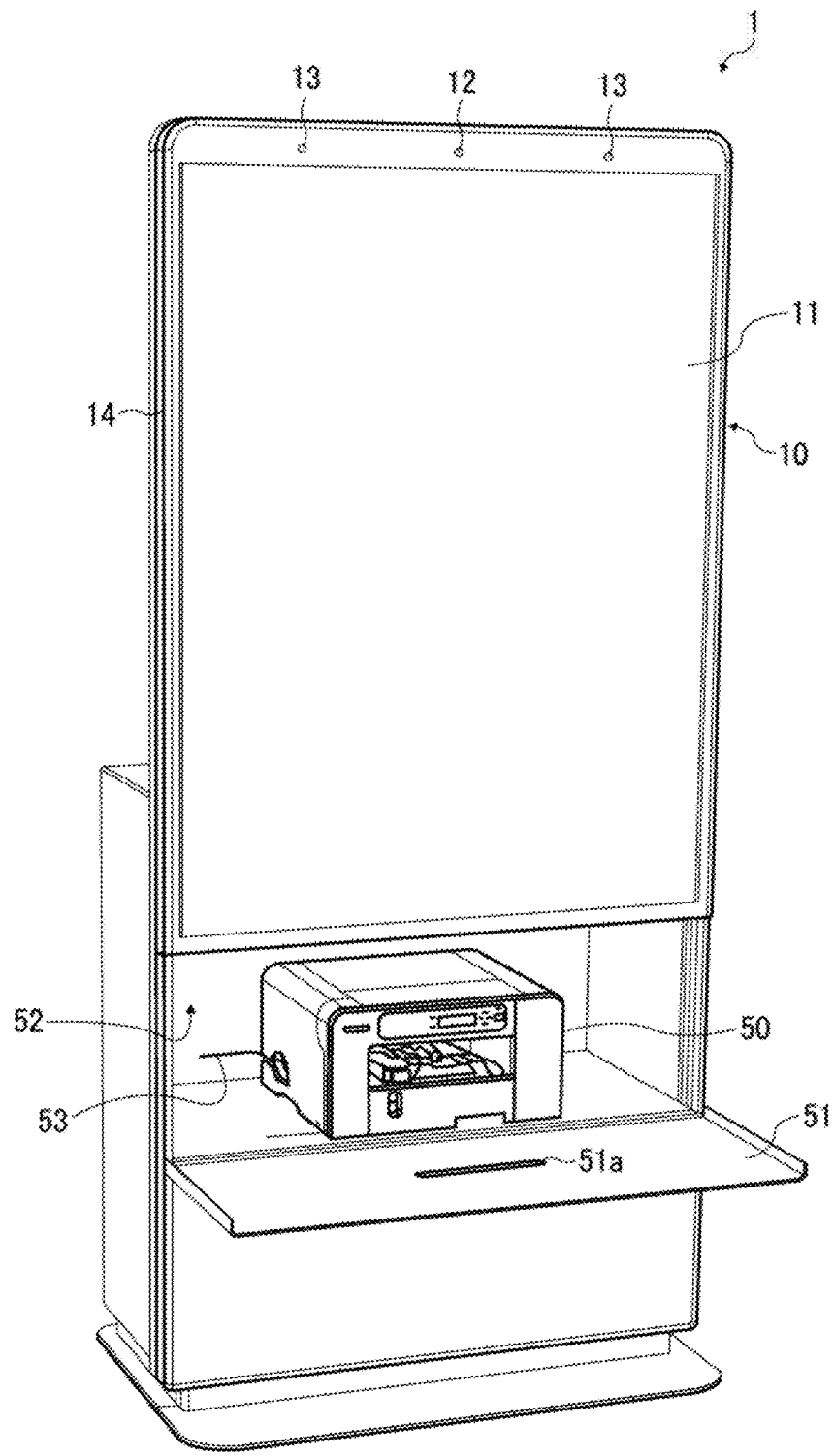
FIG. 36 is a perspective view of the image forming apparatus according to the variation 2 with a front cover opened.
Figure 37:
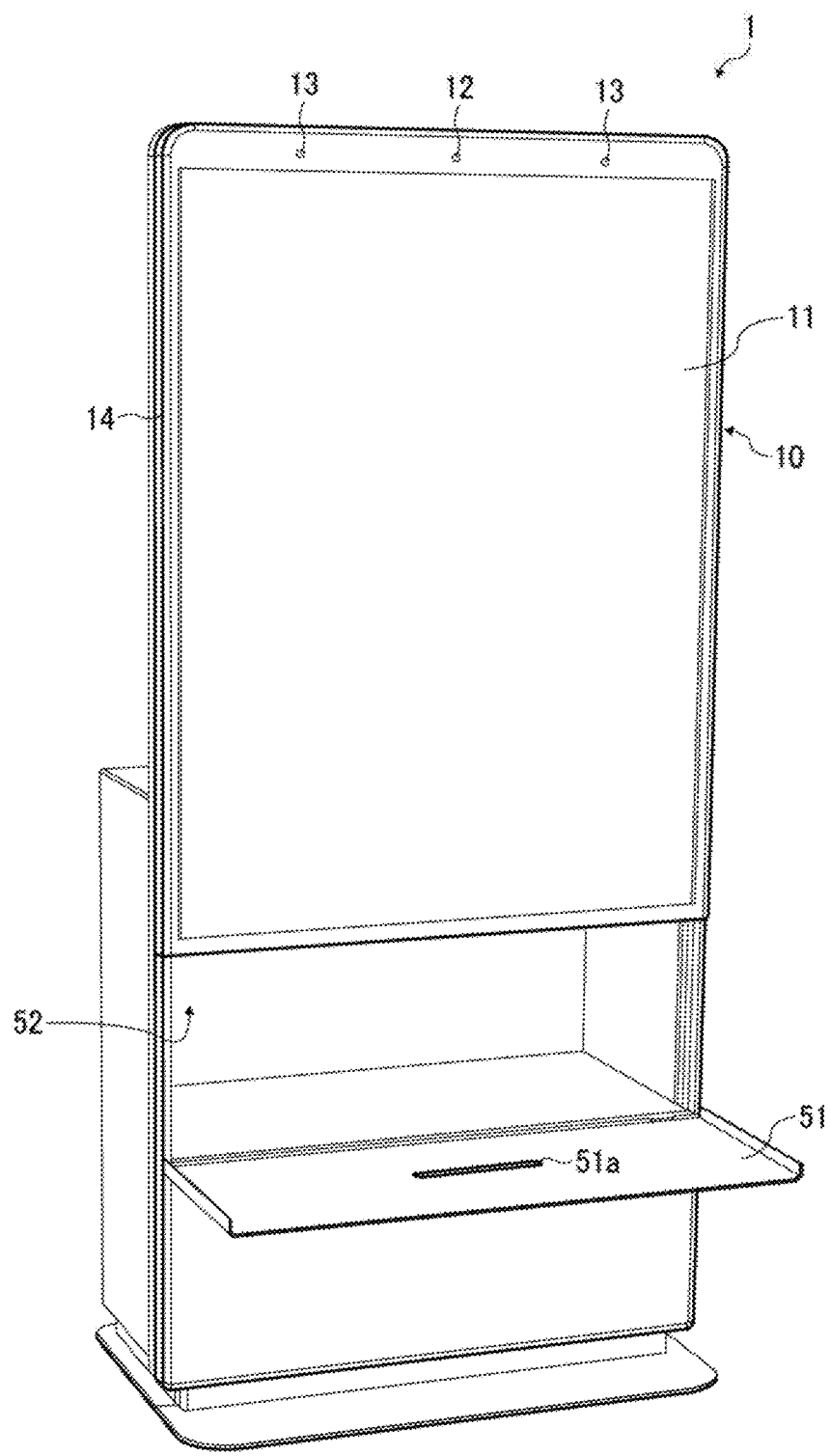
FIG. 37 is a perspective view of the image forming apparatus according to the variation 2 with an image forming device is removed from a housing portion of the image forming apparatus.

Next, a description is given of another variation (hereinafter, variation 2) in which the image forming unit of the image forming apparatus 1 according to the present embodiment is an image forming unit removably installed relative to a housing portion of the image forming apparatus 1. FIG. 35 is an external perspective view of the image forming apparatus 1 according to the present variation 2. FIG. 36 is a perspective view of the image forming apparatus 1 according to the present variation 2 in a state in which a front cover 51 is open. FIG. 37 is a perspective view of the image forming apparatus 1 according to the present variation 2 in a state in which an image forming device 50 is removed from a housing portion 52 of the image forming apparatus 1.

The image forming apparatus 1 according to the present variation 2 differs from the above-described embodiment in that, instead of the image forming unit 20 in the above-described embodiment the image forming device 50 removably installed in the housing portion 52 of the image forming apparatus 1 is employed. In the present variation 2, the image forming device 50 is an inkjet printer. However, in some embodiments, the image forming device 50 may be a printer according to electrophotography or any other image forming method.

Various types of cables 53, such as power supply wiring and control signal wiring, of the image forming device 50 are connected to a body connector of the image forming apparatus 1. The image forming device 50 is supplied with power from the body of the image forming apparatus 1 via power supply wiring, and receives, e.g., control commands and image data of a print target image from the controller 1000 in the body of the image forming apparatus 1 through control signal wiring. Accordingly, in the present variation 2, the touch panel 11 of the image forming apparatus 1 also functions as a control panel. Similarly with the above-described embodiment an image can be printed according to the image data on, for example, the sheet 4 of A4 size in response to a print instructing operation of a user after checking of a preview image displayed in actual size on the touch panel 11.

In the present variation 2, the housing portion 52 to house the image forming device 50 is disposed below the display 10. However, the position of the housing portion 52 is not limited to any particular position. The housing portion 52 has an opening and a front cover 51 at the front side of the image forming apparatus 1. The image forming device 50 is installed and removed through which the opening. The front cover 51 opens and closes the opening. By closing the front cover 51, as illustrated in FIG. 35, the image forming device 50 housed in the housing portion 52 can get out of view from the outside.

The front cover 51 of the present variation 2 includes a sheet ejection port 51a to eject a printed sheet 4', on which an image is formed by the image forming device 50 in the housing portion 52, to the outside of the image forming apparatus 1. With the front cover 51 closed, the printed sheet 4' is ejected from the sheet ejection port 51a to the front side of the image forming apparatus 1. Note that, in some embodiments, the front cover 51 may not include the sheet ejection port 51a. In such a case, with the front cover 51 open, the printed sheet 4' is ejected to the front side of the image forming apparatus 1. Alternatively, instead of the configuration of ejecting the printed sheet 4' to the front side of the image forming apparatus 1, for example, a configuration of ejecting the printed sheet 4' to a lateral side or the rear side of the image forming apparatus 1 may be employed. For the configuration of ejecting the printed sheet 4' to a lateral side of the image forming apparatus 1, similarly with the above-described embodiment as illustrated in FIG. 1, a portion of the printed sheet 4' may be held to project from the ejection port at the lateral side of the image forming apparatus 1. In such a case, a riser can take the printed sheet 4' from the ejection port by gripping and drawing the projected portion of the printed sheet 4'.

Figure 38:
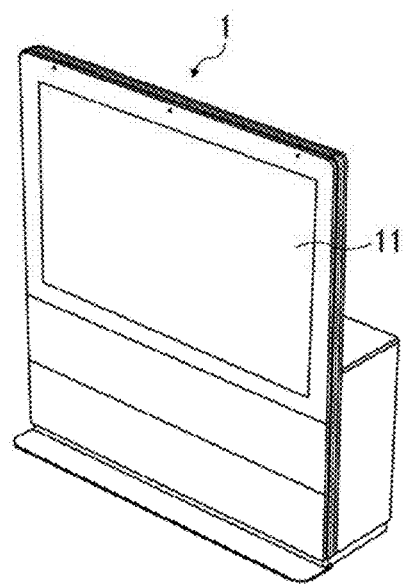
FIG. 38 is a perspective view of an example of the image forming apparatus including a horizontally long shape of the display screen of the touch panel.
Figure 39:
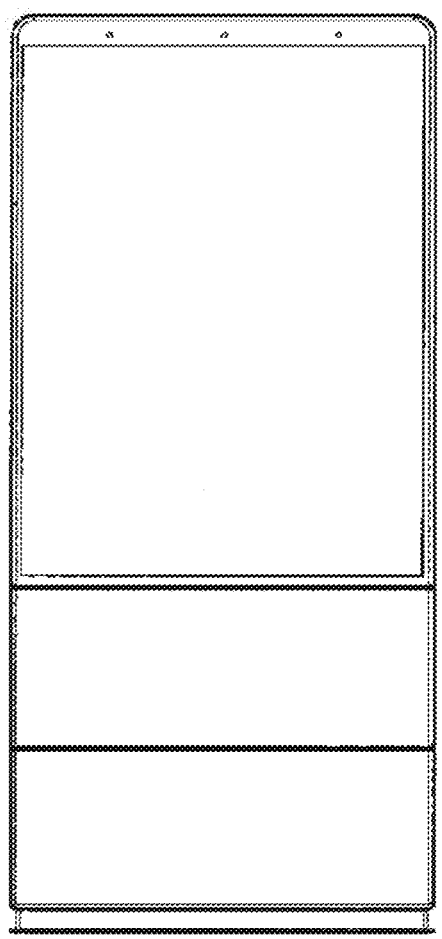
FIG. 39 is a front view of an example of a shape of the image forming apparatus.
Figure 42:
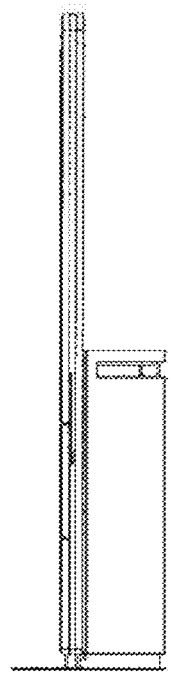
FIG. 42 is a right side view of the example of FIG. 39.
Figure 43:
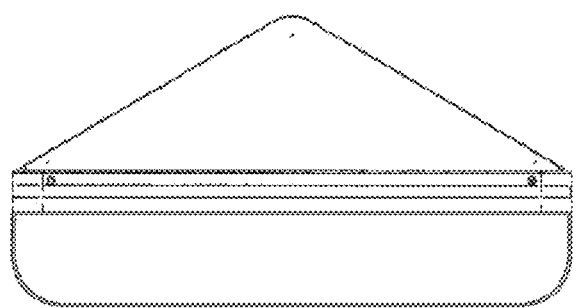
FIG. 43 is a plan view of the example of FIG. 39.
Figure 44:
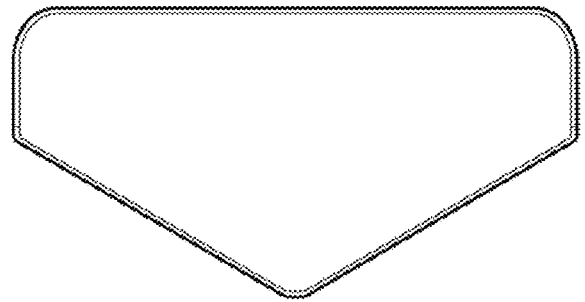
FIG. 44 is a bottom view of the example of FIG. 39.

Note that in tire above-described embodiment and variations 1 and 2, the display screen of the touch panel 11 of the image forming apparatus 1 has a vertically long shape. However, as illustrated in FIG. 38, the display screen of the touch panel 11 of the image forming apparatus 1 may have a horizontally long shape.

Figure 45:
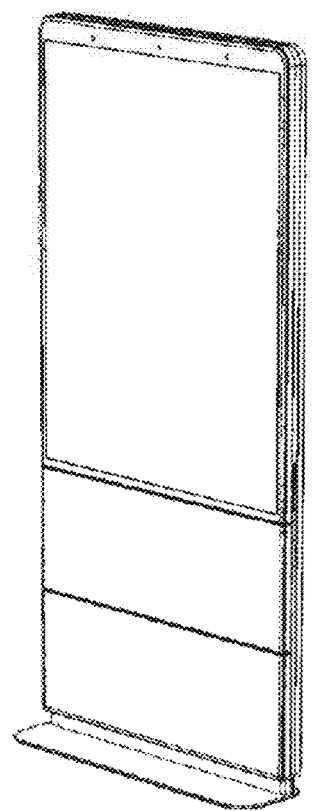
FIG. 45 is a perspective view of the example of FIG. 39, seen from the front side thereof.
Figure 46:
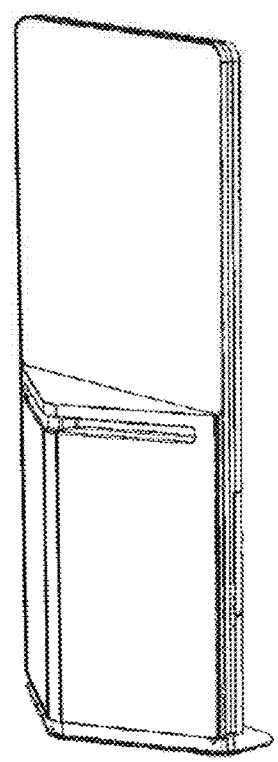
FIG. 46 is a perspective view of the example of FIG. 39, seen from the rear side thereof.

FIGS. 39 through 44 are six side views of an example of a shape of the image forming apparatus 1, illustrated as a printer, according to the present embodiment. FIG. 45 is a perspective view of the front side of the example of the image forming apparatus 1 illustrated in FIGS. 39 through 44. FIG. 46 is a perspective view of the rear side of the image forming apparatus 1. As described above, a camera unit is disposed at an upper portion of the top face of the image forming apparatus 1. The image forming apparatus 1 can take an image of an original with the camera unit and print the original image.

The exemplary embodiments described above are one example and attain advantages below in a plurality of aspects A to J.

Aspect A

An image forming apparatus, such as the image forming apparatus 1, includes a display, such as the display 10, to display a preview image on a display screen before an image is formed on a recording medium, such as the sheet 4, an image forming unit, such as the image forming unit 20, to form, on the recording medium, an image corresponding to the preview image displayed on the display screen. Each of the vertical length and the horizontal length of the display screen is equal to or greater than the length of a long side of a maximum size recording medium, such as A4 size, on which an image can be formed by the image forming unit. According to the present aspect, when the image forming unit forms an image on a maximum size recording medium on which the image forming unit can form an image, a preview image can be displayed in actual size on the display screen of the display, regardless of whether the image is formed on a recording medium in landscape orientation or in portrait orientation. Accordingly, even with the image to be formed on the maximum size recording medium, a preview image in proper orientation can be checked in actual size.

Aspect B

In the above-described aspect A, the long side of the maximum size recording medium is equal to or greater than a long side of JIS A3 (that is, 420 mm). According to the present aspect, even with an image to be formed on a recording medium of a size equal to or greater than JIS A3, a preview image in proper orientation can be checked in actual size.

Aspect C

In the above-described aspects A or B, seen from the front side of the image forming apparatus which the display screen faces, the width of the image forming apparatus is equal to or greater than twice of the length of the long side of the maximum size recording medium and the depth of the image forming apparatus is smaller than twice of the length of a short side of the maximum size recording medium. Such a configuration can achieve an image forming apparatus having a small depth (a thin shape) while securing a large size of the display screen.

Aspect D

In any of the above-described aspects A to C, the image forming apparatus includes an imaging unit, such as the camera unit 12, to take an image of an outside of the image forming apparatus and a display controller, such as the controller 1000, to display, on the display screen, a preview image of the image taken with the imaging unit. Examples of an image reading device include an image scanner, such as a flat head scanner and a sheet through scanner. However, such an image scanner includes a space to convey or place an original, which may make it difficult to secure a large size of the display screen of the display on the surface of the image forming apparatus. For the configuration of the present aspect in which an original image is taken and read with the imaging unit, the setting space of the imaging unit is relatively small, thus more easily securing a large size of the display screen of the display at the surface of the image forming apparatus.

Aspect E

In any of the above-described aspects A to D, the image forming apparatus includes a recording-medium ejection port, such as the ejection port 27, to eject a recording medium, such as the sheet 4' on which the image has been formed with the image forming unit. The recording-medium ejection port is disposed at a side different from the front side of the image forming apparatus, at which the display screen is disposed, or below the display screen at the front side of the image forming apparatus. Such a configuration can prevent a recording medium ejected from the recording-medium ejection port from hanging over the display screen, thus preventing the display screen from being the recording medium having an image formed thereof from blocking the display screen. In addition, when a user performs printing using the image forming apparatus from an external device, such as a personal computer, communicatively connected to the image forming apparatus, the user can take a recording medium having an image formed thereon without interrupting another user that performs operation in front, of the display screen of the image forming apparatus.

Aspect F

In any of the above-described aspects A to E, the image forming apparatus includes an operation position detector, such as the touch panel 11, to defect an operation position of a user on the display screen. Such a configuration can obviate the necessity for disposing an operation unit at a position different from the display screen or downsize an operation unit at a position different from the display screen. Thus, a larger size of the display screen of the display on the surface of the image forming apparatus can be obtained.

Aspect G

In the above-described aspect F, the image forming apparatus includes a display controller, such as the controller 1000, to display a superimposed preview image in which an additional image added by a user is superimposed on the preview image, on the display screen, based on a detection result of the operation position detector detected when the preview image is displayed on the display screen. Such a configuration can form, on the recording medium, the superimposed preview image in which the additional image added by the user is superimposed on the preview image displayed on the display screen of the display.

Aspect H

In any of the above-described aspects A to G, the display screen is disposed at an upper part of the front side of the image forming apparatus, and a table, such as the optional top board 9, is disposed at the rear side of the image forming apparatus. In the configuration in which the display screen is disposed at the upper part at the front side of the image forming apparatus, the depth of the upper part of the image forming apparatus can be set to be relatively small. Since the image forming unit, such as the image forming unit 20, is disposed at a lower part of the image forming apparatus, the depth of the lower part of the image forming apparatus is set to be relatively long. As described above, a step is formed between the lower part and the upper part. However, setting the table on the step allows a rear space of the image forming apparatus to be utilized for various uses.

Aspect I

In any of the above-described aspects A to H, the image forming unit is an image forming device, such as the image forming device 50, removably installed relative to a housing portion of the image forming apparatus. Such a configuration facilitates handling of the image forming unit, thus facilitating maintenance and other operations of the image forming unit.

Aspect J

An image forming system includes an image forming apparatus according to any of the above-described aspects A to I and an image display apparatus, such as the image display apparatus 101. The image forming apparatus is coupled with the image display apparatus. An image displayed on a display of the image display apparatus can be formed on a recording medium with the image forming unit. Such a configuration can display an image with not only the display unit of the image forming apparatus but also the display of the image display apparatus.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An image forming apparatus comprising:
a display including a touch panel display screen to display a preview image before an image is formed on a recording medium;
an operation position detector to detect a series of operation positions on the touch panel display screen displaying the preview image, the detected series of operation positions forming a handwritten additional image;
a display controller to display on the display screen, a composite image including both the preview image and the handwritten additional image superimposed on the preview image; and
an image forming unit to form, on the recording medium, a post-addition image corresponding to the composite image, including both the preview image and the handwritten additional image, displayed on the display screen,
wherein each of a vertical length and a horizontal length of the display screen is equal to or greater than a length of a long side of a maximum size recording medium on which an image is to be formed by the image forming unit.

2. The image forming apparatus according to claim 1, wherein the long side of the maximum size recording medium is equal to or greater than 420 millimeters.

3. The image forming apparatus according to claim 1, wherein a width of the image forming apparatus is equal to or greater than twice of the length of the long side of the maximum size recording medium and a depth of the image forming apparatus is smaller than twice of a length of a short side of the maximum size recording medium.

4. The image forming apparatus according to claim 1, further comprising:
a camera to capture an image of an outside of the image forming apparatus, wherein
the display controller displays, on the display screen, a preview image of the captured image taken with the camera.

5. The image forming apparatus according to claim 1, further comprising
an ejection port to eject a recording medium on which the image has been formed by the image forming unit,
wherein the ejection port is disposed at a side different from a front side of the image forming apparatus.

6. The image forming apparatus according to claim 5, wherein the ejection port is disposed at a lateral side of the image forming apparatus perpendicular to the front side of the image forming apparatus.

7. The image forming apparatus according to claim 1,
wherein the display controller updates the composite image displayed on the display, as additional operation positions on the touch panel display screen are detected by the operation position detector, after the detected series of operation positions forming the handwritten additional image.

8. The image forming apparatus according to claim 1, wherein
the preview image is displayed based on image data corresponding to an original image, and
the display controller determines that an add-to-margin function has been activated by operation on the touch panel display screen, and when the add-to-margin function has been activated, the display controller adds a margin area nonoverlapping with the image data and surrounding the original image corresponding to the image data, to display an entire sheet image as the preview image on the touch panel display screen, and
when one or more of the detected operation positions detected by the operation position detector are positions in the displayed margin area, at least part of the handwritten additional image superimposed on the preview image is disposed in the margin area surrounding the original image.

9. The image forming apparatus according to claim 1,
wherein the display screen is disposed at an upper part of a front side of the image forming apparatus, and
wherein the image forming apparatus further includes a table disposed at a rear side of the image forming apparatus opposite the front side of the image forming apparatus.

10. The image forming apparatus according to claim 1,
wherein the image forming unit is an image forming device removably installed relative to a housing portion of the image forming apparatus.

11. An image forming system comprising:
the image forming apparatus according to claim 1; and
an image display apparatus,
wherein the image forming apparatus is coupled with the image display apparatus, to form an image displayed on a display of the image display apparatus, onto a recording medium with the image forming unit.

* * * * *